(12) United States Patent
Zhao et al.

(10) Patent No.: US 11,218,728 B2
(45) Date of Patent: Jan. 4, 2022

(54) METHOD AND APPARATUS FOR VIDEO CODING

(71) Applicant: TENCENT AMERICA LLC, Palo Alto, CA (US)

(72) Inventors: Xin Zhao, Santa Clara, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/889,738

(22) Filed: Jun. 1, 2020

(65) Prior Publication Data

US 2020/0389666 A1     Dec. 10, 2020

Related U.S. Application Data

(60) Provisional application No. 62/897,226, filed on Sep. 6, 2019, provisional application No. 62/877,727, filed
(Continued)

(51) Int. Cl.
*H04N 19/593* (2014.01)
*H04N 19/176* (2014.01)
*H04N 19/70* (2014.01)

(52) U.S. Cl.
CPC ......... *H04N 19/593* (2014.11); *H04N 19/176* (2014.11); *H04N 19/70* (2014.11)

(58) Field of Classification Search
CPC .... H04N 19/593; H04N 19/176; H04N 19/70; H04N 19/122; H04N 19/159; H04N 19/625; H04N 19/18
See application file for complete search history.

(56) References Cited

U.S. PATENT DOCUMENTS 9,088,770 B2 *   7/2015   Zhang .................... H04N 19/60
2017/0280162 A1 *   9/2017   Zhao ...................... H04N 19/61
(Continued)

OTHER PUBLICATIONS

Brass et al., "Versatile Video Coding (Draft 5)," JVET-N1001-v9, 14th Meeting: Geneva, CH, Mar. 19-27, 2019 (406 pages).
(Continued)

*Primary Examiner* — Richard A Hansell, Jr.
(74) *Attorney, Agent, or Firm* — Oblon, McClelland, Maier & Neustadt, L.L.P.

(57) ABSTRACT

Aspects of the disclosure provide methods, apparatuses, and non-transitory computer-readable storage mediums for video encoding/decoding. In a method, prediction information for a current block is decoded. The current block is in a current picture that is a part of a coded video sequence. The prediction information indicates a first intra prediction mode and a secondary transform index for the current block. A secondary transform core is determined based on the first intra prediction mode and the secondary transform index. A primary transform coefficient block is generated based on the secondary transform core and a first transform coefficient block of the current block. The first transform coefficient block is de-quantized from the prediction information. A size of the first transform coefficient block is less than a size of the secondary transform core. The current block is reconstructed based on the primary transform coefficient block.

18 Claims, 21 Drawing Sheets

Related U.S. Application Data on Jul. 23, 2019, provisional application No. 62/857,125, filed on Jun. 4, 2019.

(56) References Cited

U.S. PATENT DOCUMENTS

| | | | |
|---|---|---|---|
| 2017/0324643 A1* | 11/2017 | Seregin | H04N 19/136 |
| 2017/0359595 A1 | 12/2017 | Zhang et al. | |
| 2018/0103252 A1* | 4/2018 | Hsieh | H04N 19/18 |
| 2018/0302631 A1* | 10/2018 | Chiang | H04N 19/157 |
| 2019/0149822 A1* | 5/2019 | Kim | H04N 19/12 375/240.02 |

OTHER PUBLICATIONS

Chiang et al., "CE6-related: Simplifications for LFNST." JVET-O0292-v1, 15th Meeting: Gothenburg, SE, Jul. 3-12, 2019 (6 pages).
Chiang et al., "CE6-related: Simplifications for LFNST." JVET-O0292-v2, 15th Meeting: Gothenburg, SE, Jul. 3-12, 2019 (8 pages).
Chiang et al., "CE6-related: Simplifications for LFNST." JVET-O0292-v3, 15th Meeting: Gothenburg, SE, Jul. 3-12, 2019 (7 pages).
Lainema et al., "CE6-related: LFNST with one mode," JVET-O0350, 15th Meeting: Gothenburg, SE, Jul. 3-12, 2019 (4 pages).
Appendix A, JVET-O0292 Results Table 3 (22 pages).
Appendix B, JVET-O0292 Results Table 4 (24 pages).
Appendix C, JVET-O0292 Results Table 5 (24 pages).
Chiang et al., "JVET-O0292: CE6-related: Simplifications for LFNST," (7 pages).
Nokia Technologies, "CE6-related: LFNST with one mode JVET-O0350," (4 pages).
Appendix D, JVET-O0350 and O0349-v2 Results (8 pages).
Appendix E, JVET-O0350-v2 Results (8 pages).
International Search Report and Written Opinion dated Aug. 18, 2020 in International Application No. PCT/US2020/035953, citing documents AA-AC therein. (10 pages).

* cited by examiner

4x4 transform

8x8 transform

16x16 transform

FIG. 8D $$T_{R\times N} = \begin{bmatrix} t_{11} & t_{12} & t_{13} & \cdots & t_{1N} \\ t_{21} & t_{22} & t_{23} & \cdots & t_{2N} \\ \vdots & \vdots & & \ddots & \vdots \\ t_{R1} & t_{R2} & t_{R3} & \cdots & t_{RN} \end{bmatrix}$$

*FIG. 11*

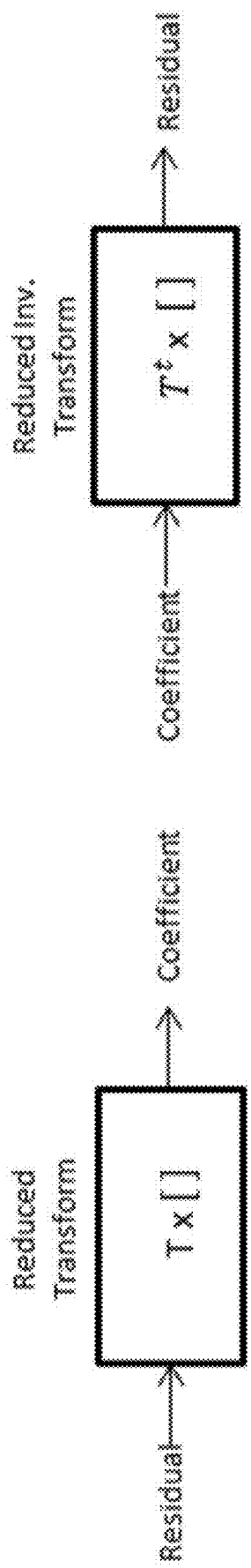

METHOD AND APPARATUS FOR VIDEO CODING

INCORPORATION BY REFERENCE

This present application claims the benefit of priority to U.S. Provisional Application No. 62/857,125, "UNIFIED SECONDARY TRANSFORM" filed on Jun. 4, 2019, U.S. Provisional Application No. 62/877,727, "FURTHER UNIFIED SECONDARY TRANSFORM" filed on Jul. 23, 2019, and U.S. Provisional Application No. 62/897,226, "SECONDARY TRANSFORM DESIGN WITH EFFICIENT ENCODER OPTION" filed on Sep. 6, 2019, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate) of, for example, 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may be predicted itself.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102). That is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 93 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (105) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of a neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described herein is a technique henceforth referred to as "spatial merge."

Referring to FIG. 1C, a current block (111) can include samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (112 through 116, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry.

According to aspects of the disclosure, there is provided a method for video decoding in a decoder. In the method, prediction information for a current block is decoded. The current block is in a current picture that is a part of a coded video sequence. The prediction information indicates a first intra prediction mode and a secondary transform index for the current block. A secondary transform core is determined based on the first intra prediction mode and the secondary transform index. A primary transform coefficient block is generated based on the secondary transform core and a first transform coefficient block of the current block. The first transform coefficient block is de-quantized from the prediction information. A size of the first transform coefficient block is less than a size of the secondary transform core. The current block is reconstructed based on the primary transform coefficient block.

In an embodiment, a second transform coefficient block is generated. A value at each coordinate position of the second transform coefficient block is 0. A value at a coordinate position of the second transform coefficient block is determined based on a value at a same coordinate position of the first transform coefficient block. The primary transform coefficient block is generated based on the secondary transform core and the second transform coefficient block.

In an embodiment, a part of the secondary transform core is applied to the first transform coefficient block.

In an embodiment, whether to transpose the primary transform coefficient block is determined based on a type of one-dimensional cross-component linear model. The primary transform coefficient block is transposed based on a determination that the primary transform coefficient block is to be transposed.

In an embodiment, syntax elements of the first transform coefficient block include a syntax element that indicates the secondary transform index.

In an embodiment, the secondary transform index is signaled after a last non-zero transform coefficient of the first transform coefficient block and before one or more of the syntax elements related to coefficient coding of the first transform coefficient block.

In an embodiment, whether one of the syntax elements is signaled is dependent on the secondary transform index and a transform coefficient associated with the one of the syntax elements.

In an embodiment, a syntax element indicating one or more primary transform cores for the current block is signaled after a last non-zero transform coefficient of the first transform coefficient block and before one or more syntax elements related to coefficient coding of the first transform coefficient block.

In an embodiment, a context used for entropy coding of the secondary transform index is determined based on a shape of the secondary transform core.

In an embodiment, the secondary transform core is determined based on the secondary transform index, a mode number of the first intra prediction mode, and a second intra prediction mode adjacent to the first intra prediction mode.

In an embodiment, a context used for entropy coding of the secondary transform index is determined based on a mode number of the first intra prediction mode.

Aspects of the disclosure provide an apparatus configured to perform any one or a combination of the methods for video decoding. In an embodiment, the apparatus includes processing circuitry that decodes prediction information for a current block in a current picture that is a part of a coded video sequence. The prediction information indicates a first intra prediction mode and a secondary transform index for the current block. The processing circuitry determines a secondary transform core based on the first intra prediction triode and the secondary transform index. The processing circuitry generates a primary transform coefficient block based on the secondary transform core and a first transform coefficient block of the current block. The first transform coefficient block is de-quantized from the prediction information. A size of the first transform coefficient block is less than a size of the secondary transform core. The processing circuitry reconstructs the current block based on the primary transform coefficient block.

Aspects of the disclosure also provide a non-transitory computer-readable medium storing instructions which when executed by a computer for video decoding cause the computer to perform any one or a combination of the methods for video decoding.

BRIEF DESCRIPTION OF THE DRAWINGS

Further features, the nature, and various advantages of the disclosed subject matter will be more apparent from the following detailed description and the accompanying drawings in which:

Figures 8A, 8B:
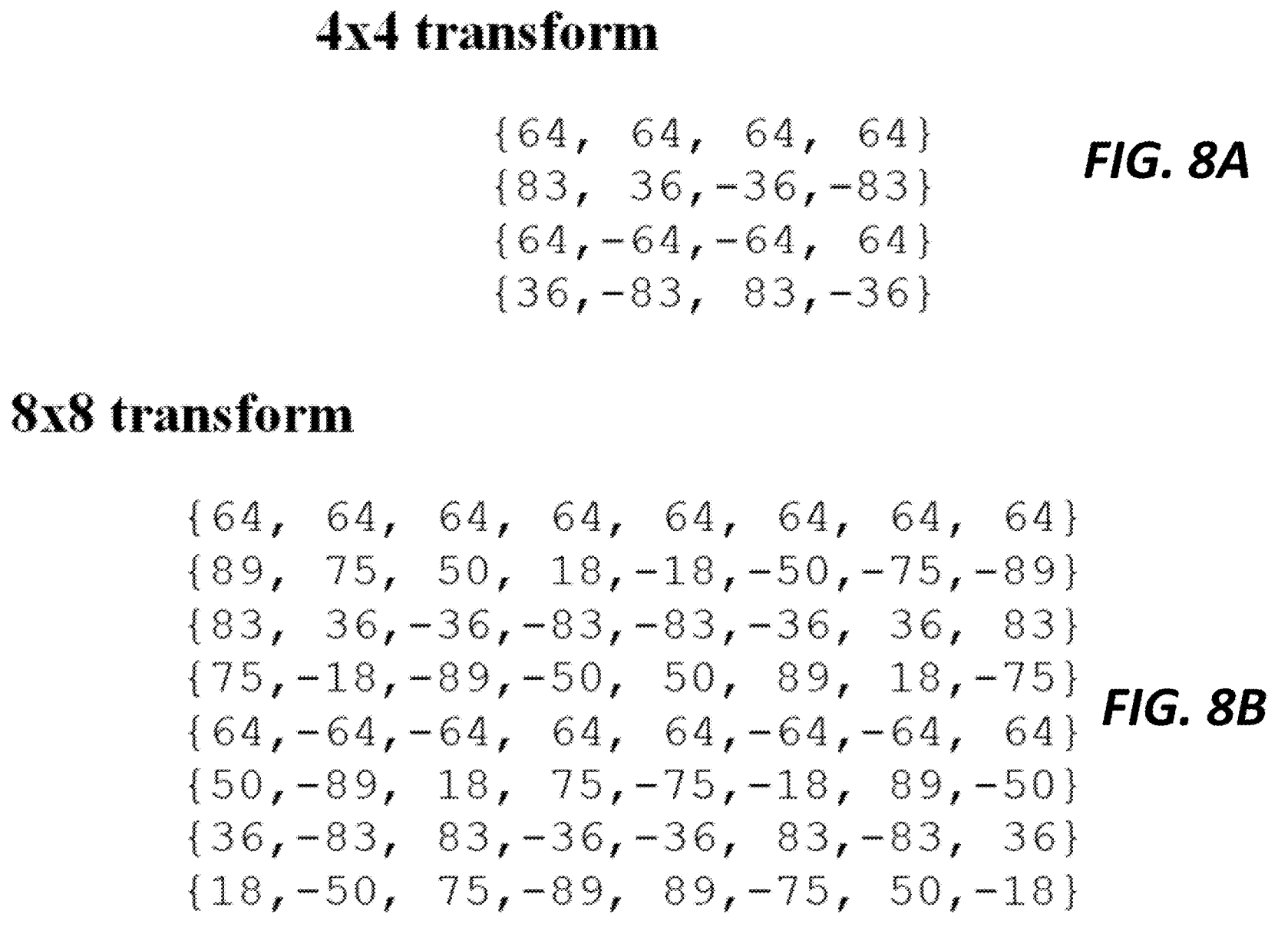
Figure 8C:
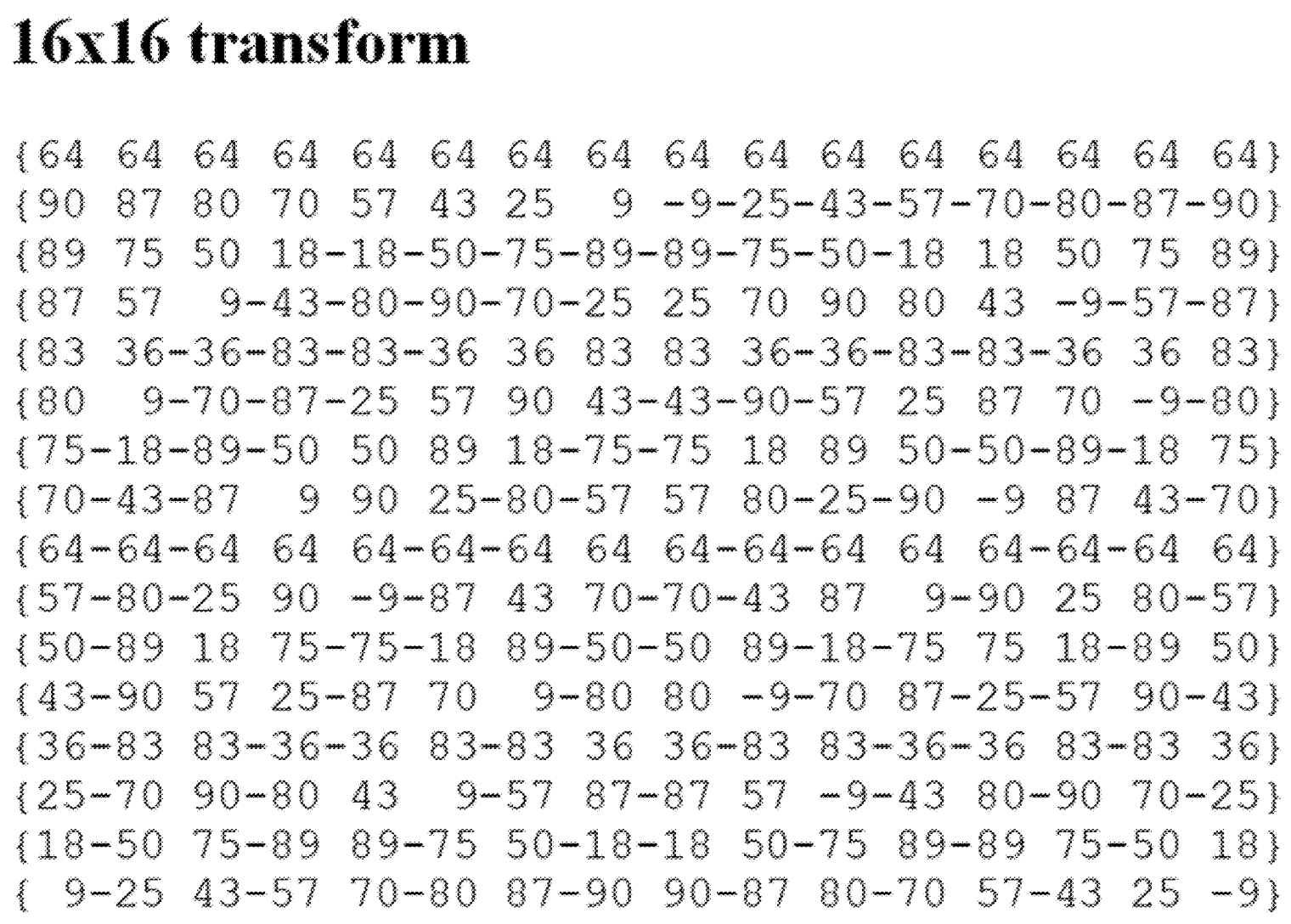
Figure 8D:
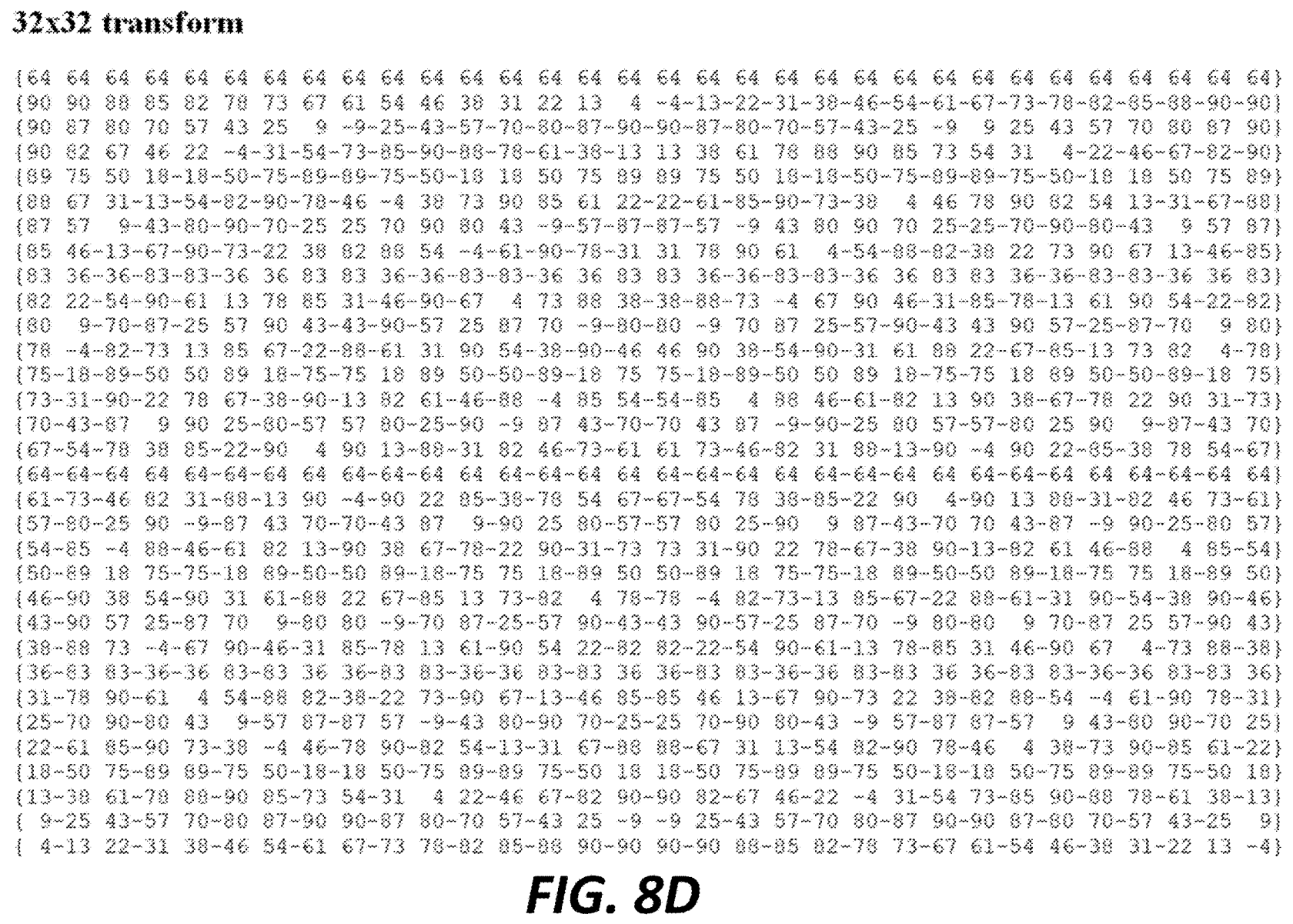

FIGS. 8A-8D show a 4×4 transform matrix, an 8×8 transform matrix, a 16×16 transform matrix, and a 32×32 transform matrix in some examples, respectively;

FIG. 11 shows an exemplary reduced size transform (RST) matrix in some examples;

FIGS. 12A and 12B show a simplified reduced transform and a simplified reduced inverse transform in some examples, respectively;

DETAILED DESCRIPTION OF EMBODIMENTS

The present disclosure includes embodiments directed to unified secondary transform. The embodiments include methods, apparatuses, and non-transitory computer-readable storage mediums for improving secondary transform process. In addition, a block may refer to a prediction block, a coding block, or a coding unit.

I. Video Encoder and Decoder

Figure 1A:
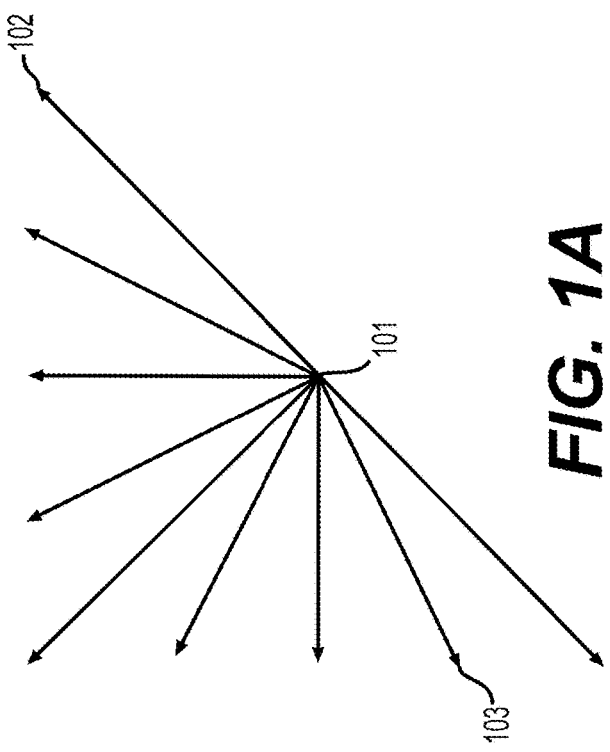
FIG. 1A shows a schematic illustration of an exemplary subset of intra prediction modes.
Figure 1B:
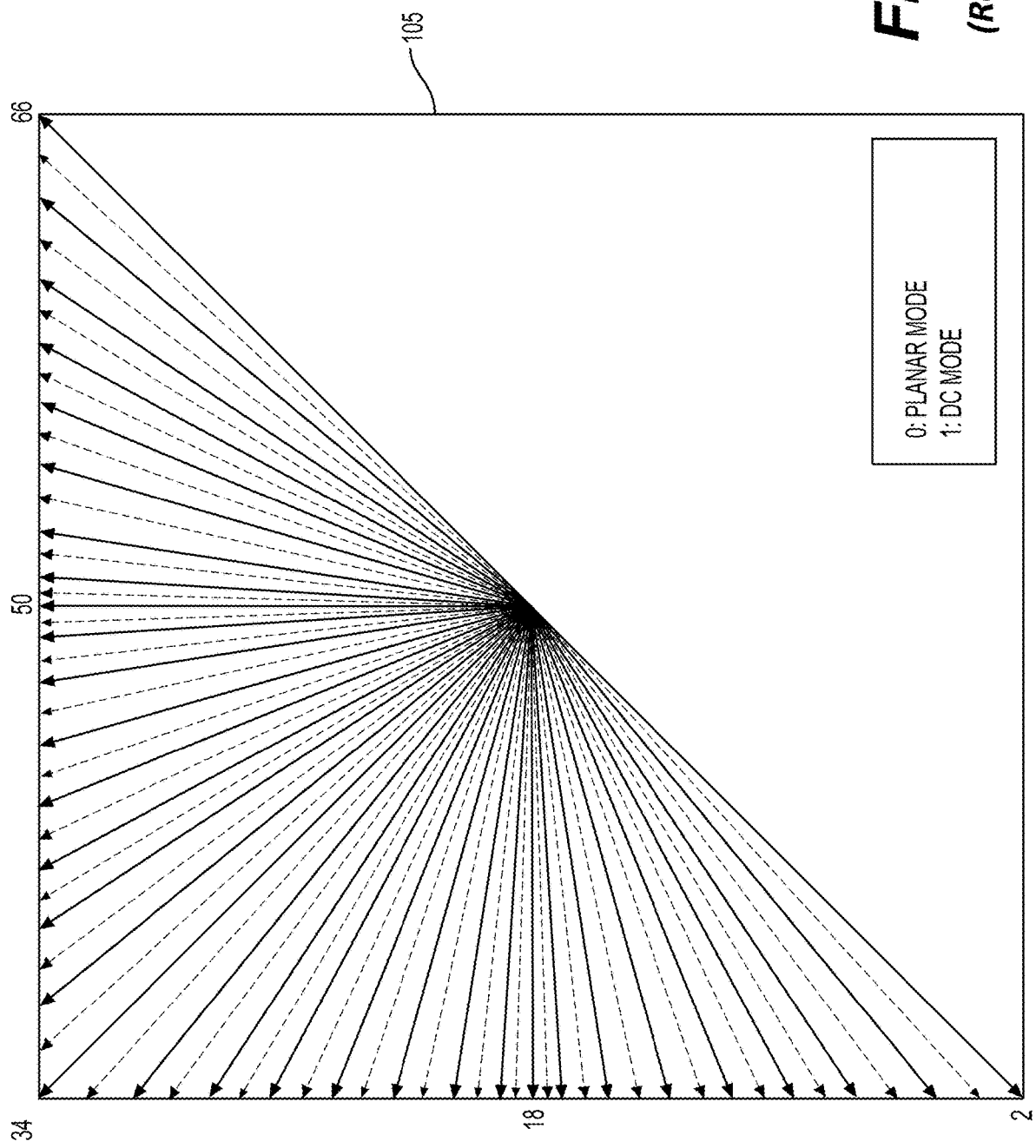
FIG. 1B shows an illustration of exemplary intra prediction directions.
Figure 1C:
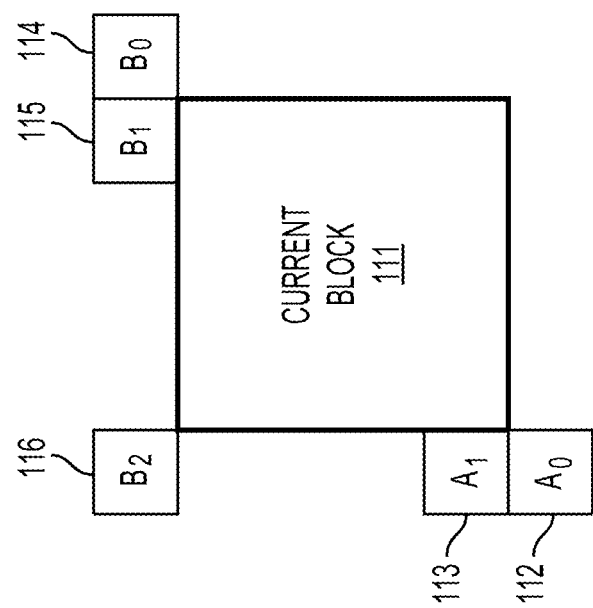
FIG. 1C shows a schematic illustration of a current block and its surrounding spatial merge candidates in one example.
Figure 2:
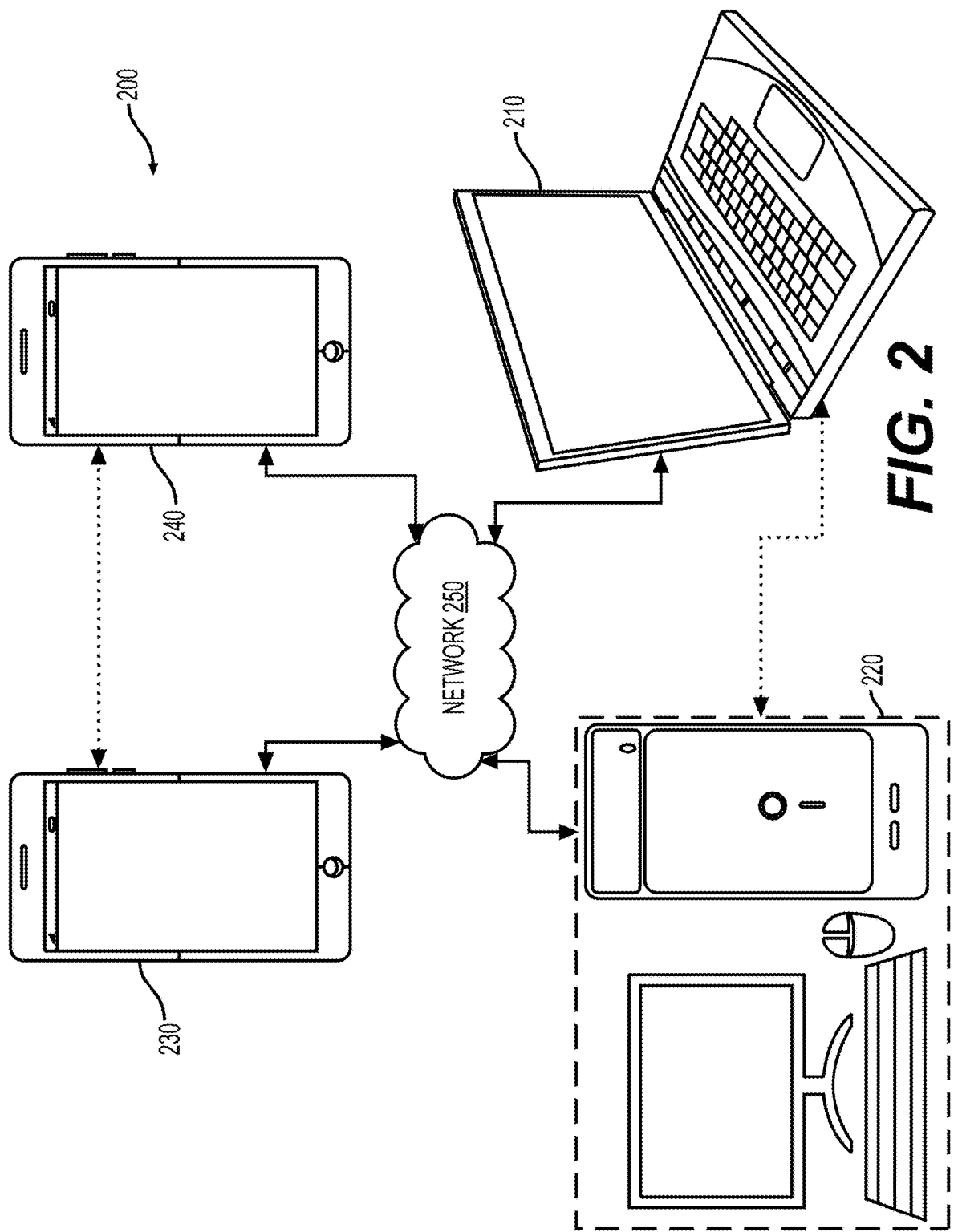
FIG. 2 shows a schematic illustration of a simplified block diagram of a communication system in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
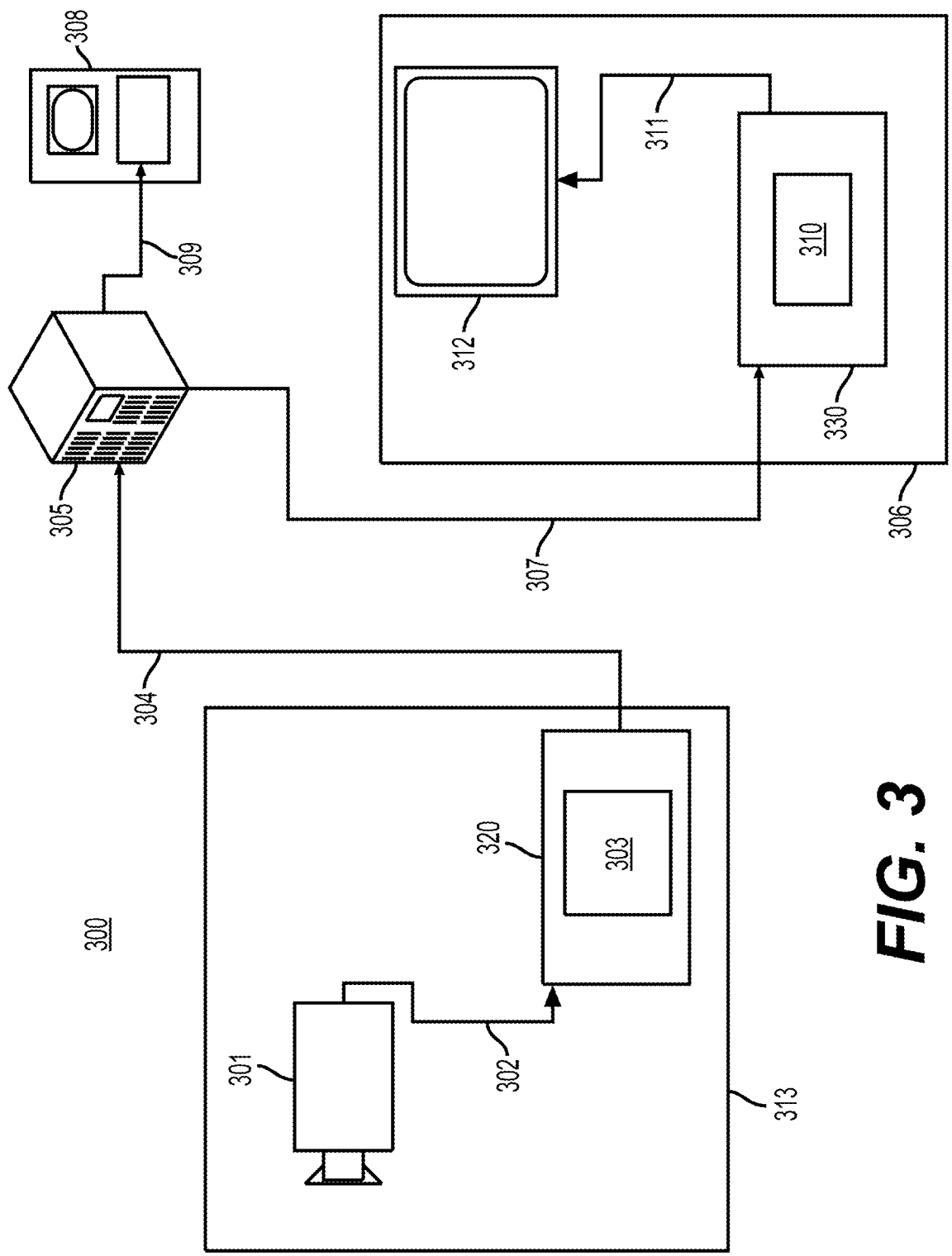
FIG. 3 shows a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick, and the like.

A streaming system may include a capture subsystem (313) that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
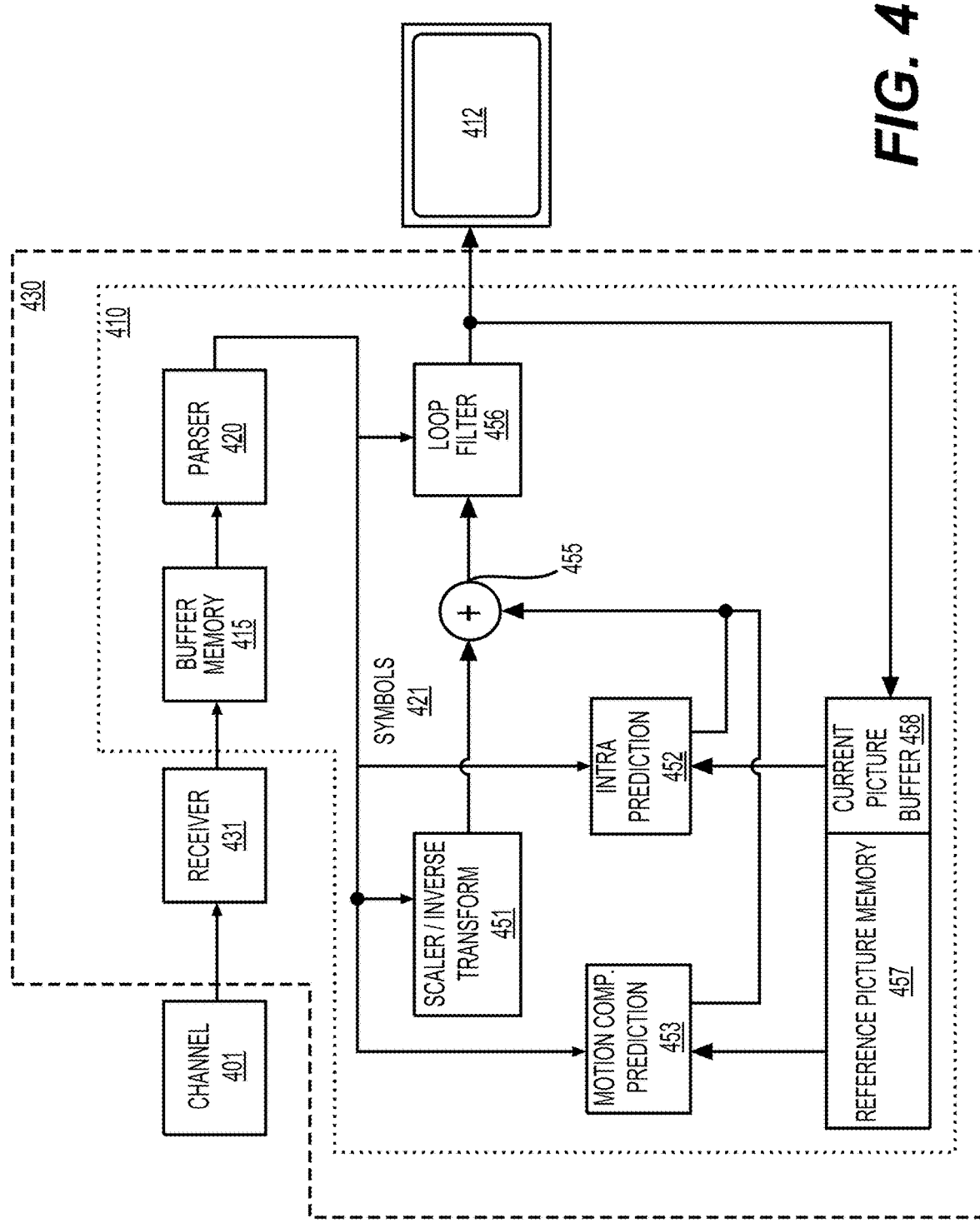
FIG. 4 shows a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG.

4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information that the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
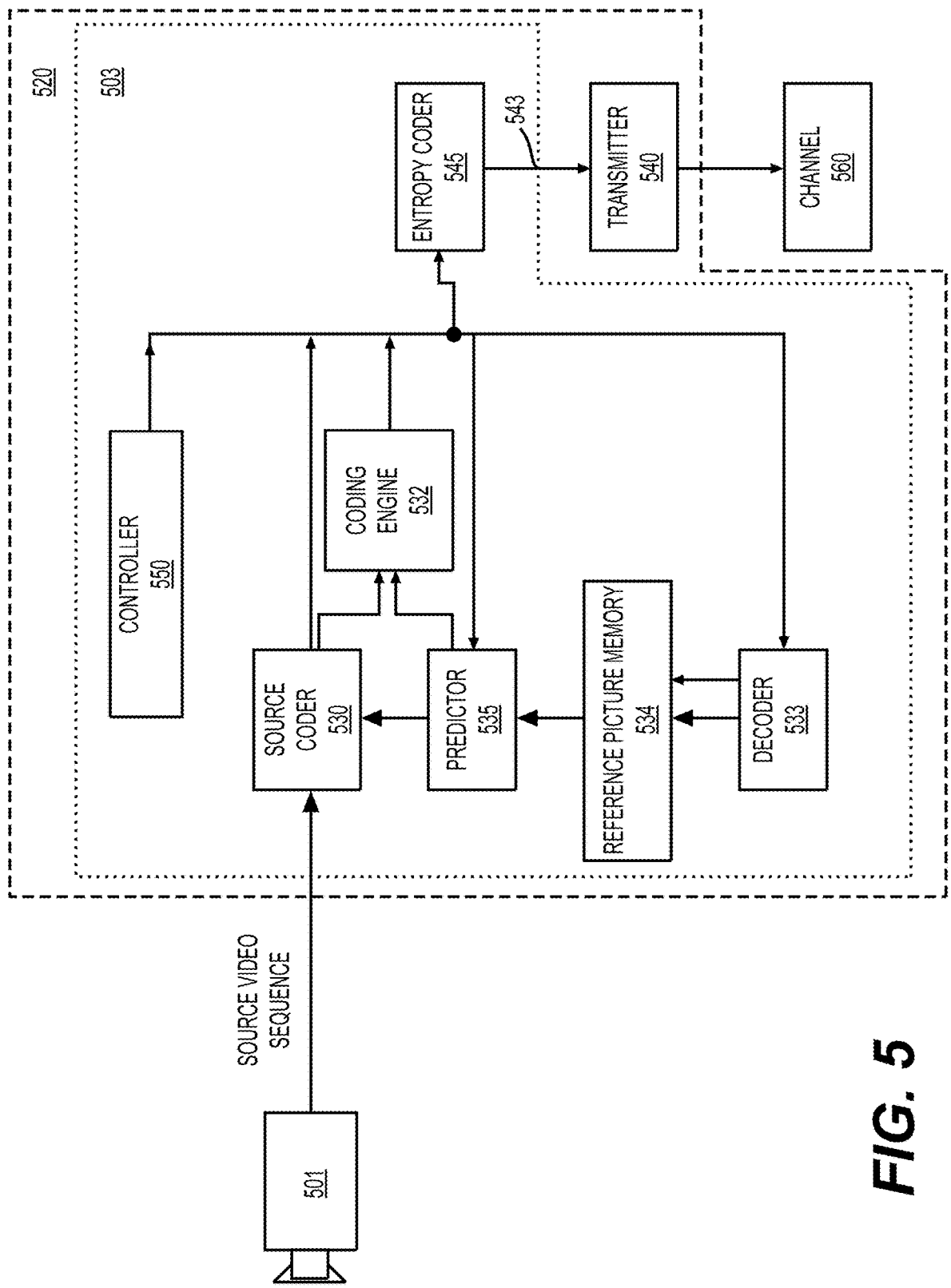
FIG. 5 shows a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector allowed reference area, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415) and the parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predicatively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quad-tree split into one or multiple CUs. For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
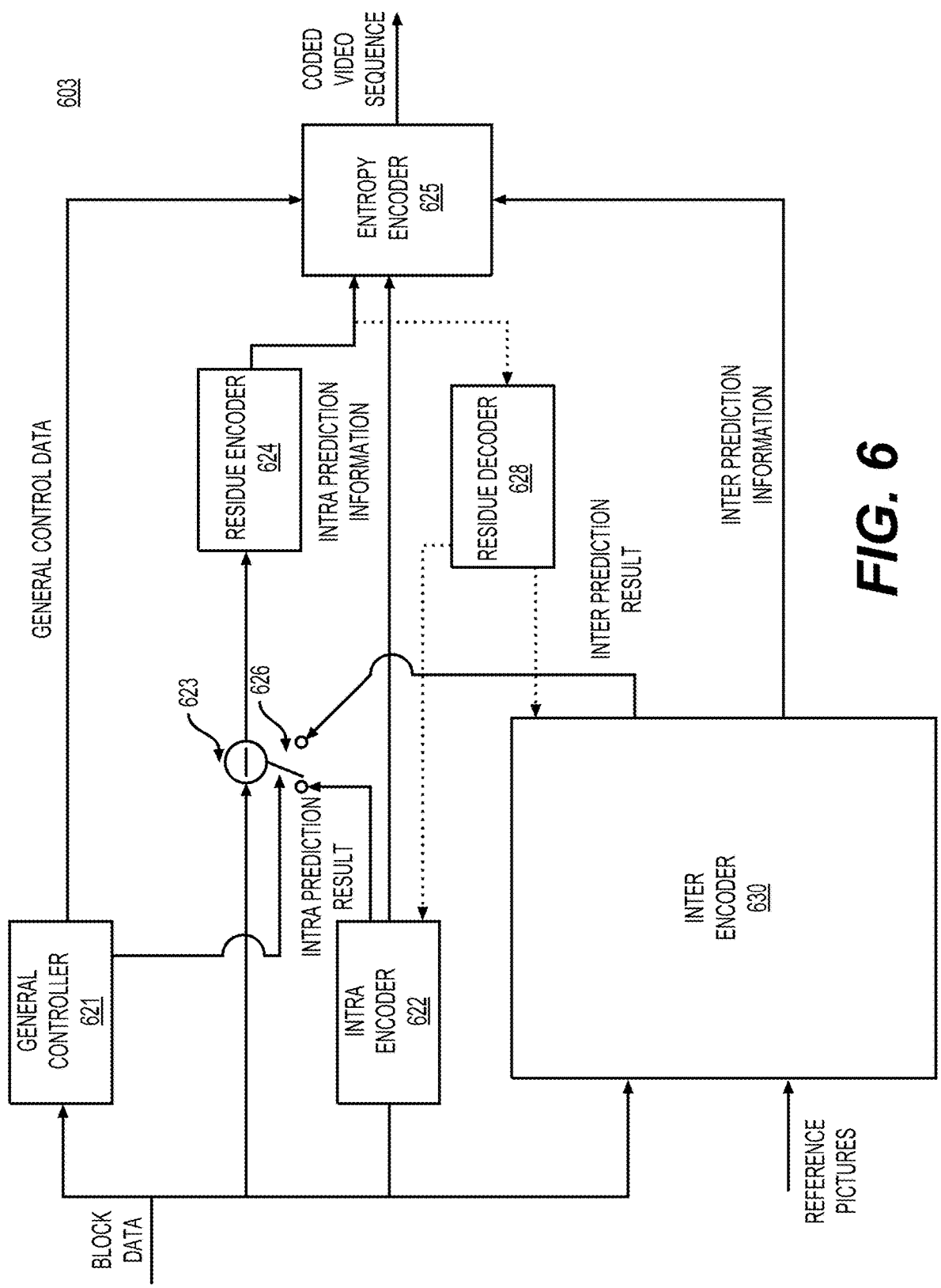
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
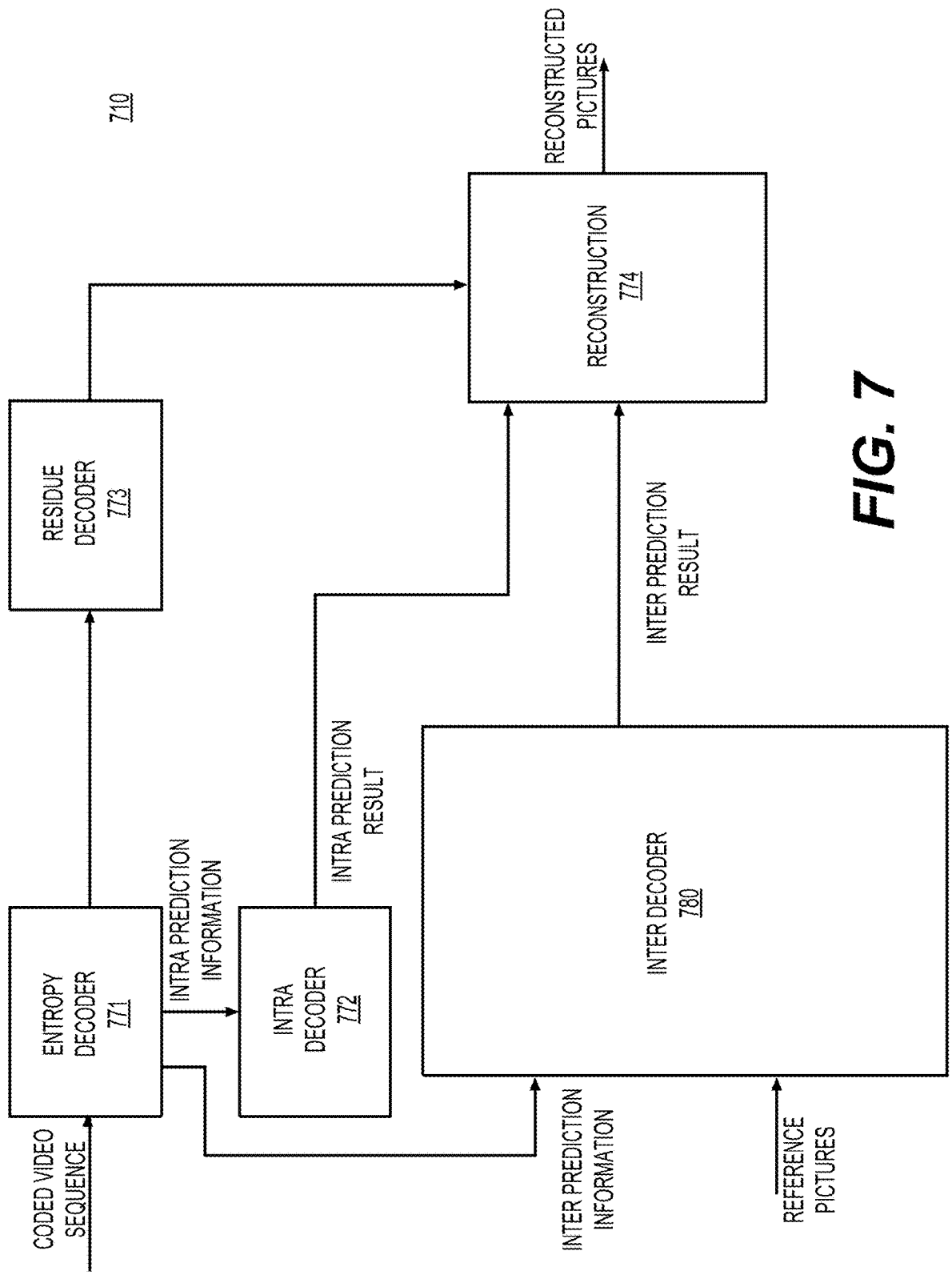
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (603), and the video decoders (310), (410), and (710) can be implemented using one or more processors that execute software instructions.

II. HEVC Primary Transform

Primary transforms can include 4-point, 8-point, 16-point, and 32-point DCT-2, such as in HEVC, and the transform core matrices can be represented using 8-bit integers, i.e., 8-bit transform core. The transform core matrices of smaller DCT-2 can be part of matrices of larger DCT-2 and include a 4×4 transform, an 8×8 transform, a 16×16 transform, and a 32×32 transform, as shown in FIGS. 8A-8D, respectively.

The DCT-2 cores show symmetry/anti-symmetry characteristics, thus a so-called "partial butterfly" implementation is supported to reduce the number of operation counts (multiplications, adds/subs, shifts), and identical results of matrix multiplication can be obtained using partial butterfly.

III. VVC Primary Transform

Besides 4-point, 8-point, 16-point, and 32-point DCT-2 transforms, such as in HEVC, additional 2-point and 64-point DCT-2 can also be included, such as in VVC.

The 64-point DCT-2 core defined in VVC is shown below as a 64×64 matrix,

```
{
  { aa, aa, aa, aa, aa, aa, aa, aa, aa, aa, aa, aa, aa, aa, aa, aa, aa, aa, aa, aa, aa, aa, aa, aa, aa, aa, aa, aa,
  aa, aa, aa, aa, aa, aa, aa, aa, aa, aa, aa, aa, aa, aa, aa, aa, aa, aa, aa, aa, aa, aa, aa, aa, aa, aa, aa, aa,
  aa, aa, aa, aa, aa, aa, aa, aa }
  { bf, bg, bh, bi, bj, bk, bl, bm, bn, bo, bp, bq, br, bs, bt, bu, bv, bw, bx, by, bz, ca, cb, cc, cd, ce, cf,
  cg, ch, ci, cj, ck, -ck, -cj, -ci, -ch, -cg, -cf, -ce, -cd, -cc, -cb, -ca, -bz, -by, -bx, -bw, -bv, -bu, -bt, -bs, -br, -bq, -bp,
  -bo, -bn, -bm, -bl, -bk, -bj, -bi, -bh, -bg, -bf }
  { ap, aq, ar, as, at, au, av, aw, ax, ay, az, ba, bb, bc, bd, be, -be, -bd, -bc, -bb, -ba, -az, -ay, -ax, -aw, -av,
  -au, -at, -as, -ar, -aq, -ap, -ap, -aq, -ar, -as, -at, -au, -av, -aw, -ax, -ay, -az, -ba, -bb, -bc, -bd, -be, be, bd, bc, bb, ba,
  az, ay, ax, aw, av, au, at, as, ar, aq, ap }
  { bg, bj, bm, bp, bs, bv, by, cb, ce, ch, ck, -ci, -cf, -cc, -bz, -bw, -bt, -bq, -bn, -bk, -bh, -bf, -bi, -bl, -bo, -br,
  -bu, -bx, -ca, -cd, -cg, -cj, cj, cg, cd, ca, bx, bu, br, bo, bl, bi, bf, bh, bk, bn, bq, bt, bw, bz, cc, cf, ci, -ck,
  -ch, -ce, -cb, -by, -bv, -bs, -bp, -bm, -bj, -bg }
  { ah, ai, aj, ak, al, am, an, ao, -ao, -an, -am, -al, -ak, -aj, -ai, -ah, -ah, -ai, -aj, -ak, -al, -am, -an, -ao, ao, an,
  am, al, ak, aj, ai, ah, ah, ai, aj, ak, al, am, an, ao, -ao, -an, -am, -al, -ak, -aj, -ai, -ah, -ah, -ai, -aj, -ak, -al, -am,
  -an, -ao, ao, an, am, al, ak, aj, ai, ah }
  { bh, bm, br, bw, cb, cg, -ck, -cf, -ca, -bv, -bq, -bl, -bg, -bi, -bn, -bs, -bx, -cc, -ch, cj, ce, bz, bu, bp, bk, bf,
  bj, bo, bt, by, cd, ci, -ci, -cd, -by, -bt, -bo, -bj, -bf, -bk, -bp, -bu, -bz, -ce, -cj, ch, cc, bx, bs, bn, bi, bg, bl, bq,
  bv, ca, cf, ck, -cg, -cb, -bw, -br, -bm, -bh }
  { aq, at, aw, az, bc, -be, -bb, -ay, -av, -as, -ap, -ar, -au, -ax, -ba, -bd, bd, ba, ax, au, ar, ap, as, av, ay, bb,
  be, -bc, -az, -aw, -at, -aq, -aq, -at, -aw, -az, -bc, be, bb, ay, av, as, ap, ar, au, ax, ba, bd, -bd, -ba, -ax, -au, -ar,
  -ap, -as, -av, -ay, -bb, -be, bc, az, aw, at, aq }
  { bi, bp, bw, cd, ck, -ce, -bx, -bq, -bj, -bh, -bo, -bv, -cc, -cj, cf, by, br, bk, bg, bn, bu, cb, ci, -cg, -bz, -bs,
  -bl, -bf, -bm, -bt, -ca, -ch, ch, ca, bt, bm, bf, bl, bs, bz, cg, -ci, -cb, -bu, -bn, -bg, -bk, -br, -by, -cf, cj, cc, bv,
  bo, bh, bj, bq, bx, ce, -ck, -cd, -bw, -bp, -bi }
  { ad, ae, af, ag, -ag, -af, -ae, -ad, -ad, -ae, -af, -ag, ag, af, ae, ad, ad, ae, af, ag, -ag, -af, -ae, -ad, -ad, -ae, -af,
  -ag, ag, af, ae, ad, ad, ae, af, ag, -ag, -af, -ae, -ad, -ad, -ae, -af, -ag, ag, af, ae, ad, ad, ae, af, ag, -ag, -af, -ae,
  -ad, -ad, -ae, -af, -ag, ag, af, ae, ad }
  { bj, bs, cb, ck, -cc, -bt, -bk, -bi, -br, -ca, -cj, cd, bu, bl, bh, bq, bz, ci, -ce, -bv, -bm, -bg, -bp, -by, -ch, cf,
  bw, bn, bf, bo, bx, cg, -cg, -bx, -bo, -bf, -bn, -bw, -cf, ch, by, bp, bg, bm, bv, ce, -ci, -bz, -bq, -bh, -bi, -bu,
  -cd, cj, ca, br, bi, bk, bt, cc, -ck, -cb, -bs, -bj }
  { ar, aw, bb, -bd, -ay, -at, -ap, -au, -az, -be, ba, av, aq, as, ax, bc, -bc, -ax, -as, -aq, -av, -ba, be, az, au, ap,
  at, ay, bd, -bb, -aw, -ar, -ar, -aw, -bb, bd, ay, at, ap, au, az, be, -ba, -av, -aq, -as, -ax, -bc, bc, ax, as, aq, av,
  ba, -be, -az, -au, -ap, -at, -ay, -bd, bb, aw, ar }
  { bk, bv, cg, -ce, -bt, -bi, -bm, -bx, -ci, cc, br, bg, bo, bz, ck, -ca, -bp, -bf, -bq, -cb, cj, by, bn, bh, bs, cd,
  -ch, -bw, -bl, -bj, -bu, -cf, cf, bu, bj, bl, bw, ch, -cd, -bs, -bh, -bn, -by, -cj, cb, bq, bf, bp, ca, -ck, -bz, -bo, -bg,
  -br, -cc, ci, bx, bm, bi, bt, ce, -cg, -bv, -bk }
  { ai, al, ao, -am, -aj, -ah, -ak, -an, an, ak, ah, aj, am, -ao, -al, -ai, -ai, -al, -ao, am, aj, ah, ak, an, -an, -ak, -ah,
  -aj, -am, ao, al, ai, ai, al, ao, -am, -aj, -ah, -ak, -an, an, ak, ah, aj, am, -ao, -al, -ai, -ai, -al, -ao, am, aj, ah, ak,
  an, -an, -ak, -ah, -aj, -am, ao, al, ai }
  { bl, by, -ck, -bx, -bk, -bm, -bz, cj, bw, bj, bn, ca, -ci, -bv, -bi, -bo, -cb, ch, bu, bh, bp, cc, -cg, -bt, -bg, -bq,
  -cd, cf, bs, bf, br, ce, -ce, -br, -bf, -bs, -cf, cd, bq, bg, bt, cg, -cc, -bp, -bh, -bu, -ch, cb, bo, bi, bv, ci, -ca, -bn,
  -bj, -bw, -cj, bz, bm, bk, bx, ck, -by, -bl }
```

{ as, az, -bd, -aw, -ap, -av, -bc, ba, at, ar, ay, -be, -ax, -aq, -au, -bb, bb, au, aq, ax, be, -ay, -ar, -at, -ba, bc, av, ap, aw, bd, -az, -as, -as, -az, bd, aw, ap, av, bc, -ba, -at, -ar, -ay, be, ax, aq, au, bb, -bb, -au, -aq, -ax, -be, ay, ar, at, ba, -bc, -av, -ap, -aw, -bd, az, as }
{ bm, cb, -cf, -bq, -bi, -bx, cj, bu, bf, bt, ci, -bv, -bj, -bp, -ce, cc, bn, bl, ca, -cg, -br, -bh, -bw, ck, bv, bg, bs, ch, -bz, -bk, -bo, -cd, cd, bo, bk, bz, -ch, -bs, -bg, -bv, -ck, bw, bh, br, cg, -ca, -bl, -bn, -cc, ce, bp, bj, by, -ci, -bt, -bf, -bu, -cj, bx, bi, bq, cf, -cb, -bm }
{ ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab }
{ bn, ce, -ca, -bj, -br, -ci, bw, bf, by, -cj, -bs, -bi, -bz, cf, bo, bm, cd, -cb, -bk, -bq, -ch, bx, bg, bu, -ck, -bt, -bh, -by, cg, bp, bl, cc, -cc, -bl, -bp, -cg, by, bh, bt, ck, -bu, -bg, -bx, ch, bq, bk, cb, -cd, -bm, -bo, -cf, bz, bi, bs, cj, -bv, -bf, -bw, ci, br, bj, ca, -ce, -bn }
{ at, bc, -ay, -ap, -ax, bd, au, as, bb, -az, -aq, -aw, be, av, ar, ba, -ba, -ar, -ay, -be, aw, aq, az, -bb, -as, -au, -bd, ax, ap, ay, -bc, -at, -at, -bc, ay, ap, ax, -bd, -au, -as, -bb, az, aq, aw, -be, -av, -ar, -ba, ba, ar, ay, be, -aw, -aq, -az, bb, as, au, bd, -ax, -ap, -ay, bc, at }
{ bo, ch, -bv, -bh, -ca, cc, bj, bt, -cj, -bq, -bm, -cf, bx, bf, by, -ce, -bl, -br, -ck, bs, bk, cd, -bz, -bg, -bw, cg, bn, bp, ci, -bu, -bi, -cb, cb, bi, bu, -ci, -bp, -bn, -cg, bw, bg, bz, -cd, -bk, -bs, ck, br, bl, ce, -by, -bf, -bx, cf, bm, bq, cj, -bt, -bj, -cc, ca, bh, by, -ch, -bo }
{ aj, ao, -ak, -ai, -an, al, ah, am, -am, -ah, -al, an, ai, ak, -ao, -aj, -aj, -ao, ak, ai, an, -al, -ah, -am, am, ah, al, -an, -ai, -ak, ao, aj, aj, ao, -ak, -ai, -an, al, ah, am, -am, -ah, -al, an, ai, ak, -ao, -aj, -aj, -ao, ak, ai, an, -al, -ah, -am, am, ah, al, -an, -ai, -ak, ao, aj }
{ bp, ck, -bq, -bo, -cj, br, bn, ci, -bs, -bm, -ch, bt, bl, cg, -bu, -bk, -cf, bv, bj, ce, -bw, -bi, -cd, bx, bh, cc, -by, -bg, -cb, bz, bf, ca, -ca, -bf, -bz, cb, bg, by, -cc, -bh, -bx, cd, bi, bw, -ce, -bj, -bv, cf, bk, bu, -cg, -bl, -bt, ch, bm, bs, -ci, -bn, -br, cj, bo, bq, -ck, -bp }
{ au, -be, -at, -av, bd, as, aw, -bc, -ar, -ax, bb, aq, ay, -ba, -ap, -az, az, ap, ba, -ay, -aq, -bb, ax, ar, bc, -aw, -as, -bd, av, at, be, -au, -au, be, at, av, -bd, -as, -aw, bc, ar, ax, -bb, -aq, -ay, ba, ap, az, -az, -ap, -ba, ay, aq, bb, -ax, -ar, -bc, aw, as, bd, -av, -at, -be, au }
{ bq, -ci, -bl, -bv, cd, bg, ca, -by, -bi, -cf, bt, bn, ck, -bo, -bs, cg, bj, bx, -cb, -bf, -cc, bw, bk, ch, -br, -bp, cj, bm, bu, -ce, -bh, -bz, bz, bh, ce, -bu, -bm, -cj, bp, br, -ch, -bk, -bw, cc, bf, cb, -bx, -bj, -cg, bs, bo, -ck, -bn, -bt, cf, bi, by, -ca, -bg, -cd, bv, bl, ci, -bq }
{ ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae }
{ br, -cf, -bg, -cc, bu, bo, -ci, -bj, -bz, bx, bl, ck, -bm, -bw, ca, bi, ch, -bp, -bt, cd, bf, ce, -bs, -bq, cg, bh, cb, -bv, -bn, cj, bk, by, -by, -bk, -cj, bn, bv, -cb, -bh, -cg, bq, bs, -ce, -bf, -cd, bt, bp, -ch, -bi, -ca, bw, bm, -ck, -bl, -bx, bz, bj, ci, -bo, -bu, cc, bg, cf, -br }
{ av, -bb, -ap, -bc, au, aw, -ba, -aq, -bd, at, ax, -az, -ar, -be, as, ay, -ay, -as, be, ar, az, -ax, -at, bd, aq, ba, -aw, -au, bc, ap, bb, -av, -av, bb, ap, bc, -au, -aw, ba, aq, bd, -at, -ax, az, ar, be, -as, -ay, ay, as, -be, -ar, -az, ax, at, -bd, -aq, -ba, aw, au, -bc, -ap, -bb, av }
{ bs, -cc, -bi, -cj, bl, bz, -bv, -bp, cf, bf, cg, -bo, -bw, by, bm, -ci, -bh, -cd, br, bt, -cb, -bj, -ck, bk, ca, -bu, -bq, ce, bg, ch, -bn, -bx, bx, bn, -ch, -bg, -ce, bq, bu, -ca, -bk, ck, bj, cb, -bt, -br, cd, bh, ci, -bm, -by, bw, bo, -cg, -bf, -cf, bp, by, -bz, -bl, cj, bi, cc, -bs }
{ ak, -am, -ai, ao, ah, an, -aj, -al, al, aj, -an, -ah, -ao, ai, am, -ak, -ak, am, ai, -ao, -ah, -an, aj, al, -al, -aj, an, ah, ao, -ai, -am, ak, ak, -am, -ai, ao, ah, an, -aj, -al, al, aj, -an, -ah, -ao, ai, am, -ak, -ak, am, ai, -ao, -ah, -an, aj, al, -al, -aj, an, ah, ao, -ai, -am, ak }
{ bt, -bz, -bn, cf, bh, ck, -bi, -ce, bo, by, -bu, -bs, ca, bm, -cg, -bg, -cj, bj, cd, -bp, -bx, by, br, -cb, -bl, ch, bf, ci, -bk, -cc, bq, bw, -bw, -bq, cc, bk, -ci, -bf, -ch, bl, cb, -br, -bv, bx, bp, -cd, -bj, cj, bg, cg, -bm, -ca, bs, bu, -by, -bo, ce, bi, -ck, -bh, -cf, bn, bz, -bt }
{ aw, -ay, -au, ba, as, -bc, -aq, be, ap, bd, -ar, -bb, at, az, -av, -ax, ax, av, -az, -at, bb, ar, -bd, -ap, -be, aq, bc, -as, -ba, au, ay, -aw, -aw, ay, au, -ba, -as, bc, aq, -be, -ap, -bd, ar, bb, -at, -az, av, ax, -ax, -av, az, at, -bb, -ar, bd, ap, be, -aq, -bc, as, ba, -au, -ay, aw }
{ bu, -bw, -bs, by, bq, -ca, -bo, cc, bm, -ce, -bk, cg, bi, -ci, -bg, ck, bf, cj, -bh, -ch, bj, cf, -bl, -cd, bn, cb, -bp, -bz, br, bx, -bt, -bv, bv, bt, -bx, -br, bz, bp, -cb, -bn, cd, bl, -cf, -bj, ch, bh, -cj, -bf, -ck, bg, ci, -bi, -cg, bk, ce, -bm, -cc, bo, ca, -bq, -by, bs, bw, -bu }
{ aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa }
{ bv, -bt, -bx, br, bz, -bp, -cb, bn, cd, -bl, -cf, bj, ch, -bh, -cj, bf, -ck, -bg, ci, bi, -cg, -bk, ce, bm, -cc, -bo, ca, bq, -by, -bs, bw, bu, -bu, -bw, bs, by, -bq, -ca, bo, cc, -bm, -ce, bk, cg, -bi, -ci, bg, ck, -bf, cj, bh, -ch, -bj, cf, bl, -cd, -bn, cb, bp, -bz, -br, bx, bt, -bv }
{ ax, -av, -az, at, bb, -ar, -bd, ap, -be, -aq, bc, as, -ba, -au, ay, aw, -aw, -ay, au, ba, -as, -bc, aq, be, -ap, bd, ar, -bb, -at, az, av, -ax, -ax, av, az, -at, -bb, ar, bd, -ap, be, aq, -bc, -as, ba, au, -ay, -aw, aw, ay, -au, -ba, as, bc, -aq, -be, ap, -bd, -ar, bb, at, -az, -av, ax }
{ bw, -bq, -cc, bk, ci, -bf, ch, bl, -cb, -br, bv, bx, -bp, -cd, bj, cj, -bg, cg, bm, -ca, -bs, bu, by, -bo, -ce, bi, ck, -bh, cf, bn, -bz, -bt, bt, bz, -bn, -cf, bh, -ck, -bi, ce, bo, -by, -bu, bs, ca, -bm, -cg, bg, -cj, -bj, cd, bp, -bx, -bv, br, cb, -bl, -ch, bf, -ci, -bk, cc, bq, -bw }
{ al, -aj, -an, ah, -ao, -ai, am, ak, -ak, -am, ai, ao, -ah, an, aj, -al, -al, aj, an, -ah, ao, ai, -am, -ak, ak, am, -ai, -ao, ah, -an, -aj, al, al, -aj, -an, ah, -ao, -ai, am, ak, -ak, -am, ai, ao, -ah, an, aj, -al, -al, aj, an, -ah, ao, ai, -am, -ak, ak, am, -ai, -ao, ah, -an, -aj, al }
{ bx, -bn, -ch, bg, -ce, -bq, bu, ca, -bk, -ck, bj, -cb, -bt, br, cd, -bh, ci, bm, -by, -bw, bo, cg, -bf, cf, bp, -bv, -bz, bl, cj, -bi, cc, bs, -bs, -cc, bi, -cj, -bl, bz, bv, -bp, -cf, bf, -cg, -bo, bw, by, -bm, -ci, bh, -cd, -br, bt, cb, -bj, ck, bk, -ca, -bu, bq, ce, -bg, ch, bn, -bx }
{ ay, -as, -be, ar, -az, -ax, at, bd, -aq, -bb, aw, -au, -bc, ap, -bb, -av, av, bb, -ap, bc, au, -aw, bb, aq, -bd, -at, ax, az, -ar, be, as, -ay, -ay, as, be, -ar, az, ax, -at, -bd, aq, bb, -aw, au, bc, -ap, bb, av, -av, -bb, ap, -bc, -au, aw, -bb, -aq, bd, at, -ax, -az, ar, -be, -as, ay }
{ by, -bk, cj, bn, -bv, -cb, bh, -cg, -bq, bs, ce, -bf, cd, bt, -bp, -ch, bi, -ca, -bw, bm, ck, -bl, bx, bz, -bj, ci, bo, -bu, -cc, bg, -cf, -br, br, cf, -bg, cc, bu, -bo, -ci, bj, -bz, -bx, bl, -ck, -bm, bw, ca, -bi, ch, bp, -cd, -bt, bq, cg, -bh, cb, bv, -bn, -cj, bk, -by }

{ af, -ad, ag, ae, -ae, -ag, ad, -af, ad, -ag, -ae, ae, ag, -ad, af, af, -ad, ag, ae, -ae, -ag, ad, -af, -af, ad, -ag, -ae, ae, ag, -ad, af, af, -ad, ag, ae, -ae, -ag, ad, -af, -af, ad, -ag, -ae, ae, ag, -ad, af, af, -ad, ag, ae, -ae, -ag, ad, -af, -af, ad, -ag, -ae, ae, ag, -ad, af }

{ bz, -bh, ce, bu, -bm, cj, bp, -br, -ch, bk, -bw, -cc, bf, -cb, -bx, bj, -cg, -bs, bo, ck, -bn, bt, cf, -bi, by, ca, -bg, cd, by, -bl, ci, bq, -bq, -ci, bl, -by, -cd, bg, -ca, -by, bi, -cf, -bt, bn, -ck, -bo, bs, cg, -bj, bx, cb, -bf, cc, bw, -bk, ch, br, -bp, -cj, bm, -bu, -ce, bh, -bz }

{ az, -ap, ba, ay, -aq, bb, ax, -ar, bc, aw, -as, bd, av, -at, be, au, -au, -be, at, -av, -bd, as, -aw, -bc, ar, -ax, -bb, aq, -ay, -ba, ap, -az, -az, ap, -ba, -ay, aq, -bb, -ax, ar, -bc, -aw, as, -bd, -av, at, -be, -au, au, be, -at, av, bd, -as, aw, bc, -ar, ax, bb, -aq, ay, ba, -ap, az }

{ ca, -bf, bz, cb, -bg, by, cc, -bh, bx, cd, -bi, bw, ce, -bj, bv, cf, -bk, bu, cg, -bv, bt, ch, -bm, bs, ci, -bn, br, cj, -bo, bq, ck, -bp, bp, -ck, -bq, bo, -cj, -br, bn, -ci, -bs, bm, -ch, -bt, bl, -cg, -bu, bk, -cf, -bv, bj, -ce, -bw, bi, -cd, -bx, bh, -cc, -by, bg, -cb, -bz, bf, -ca }

{ am, -ah, al, an, -ai, ak, ao, -aj, aj, -ao, -ak, ai, -an, -al, ah, -am, -am, ah, -al, -an, ai, -ak, -ao, aj, -aj, ao, ak, -ai, an, al, -ah, am, am, -ah, al, an, -ai, ak, ao, -aj, aj, -ao, -ak, ai, -an, -al, ah, -am, -am, ah, -al, -an, ai, -ak, -ao, aj, -aj, ao, ak, -ai, an, al, -ah, am }

{ cb, -bi, bu, ci, -bp, bn, -cg, -bw, bg, -bz, -cd, bk, -bs, -ck, br, -bl, ce, by, -bf, bx, cf, -bm, bq, -cj, -bt, bj, -cc, -ca, bh, -bv, -ch, bo, -bo, ch, bv, -bh, ca, cc, -bj, bt, cj, -bq, bm, -cf, -bx, bf, -by, -ce, bl, -br, ck, bs, -bk, cd, bz, -bg, bw, cg, -bn, bp, -ci, -bu, bi, -cb }

{ ba, -ar, av, -be, -aw, aq, -az, -bb, as, -au, bd, ax, -ap, ay, bc, -at, at, -bc, -ay, ap, -ax, -bd, au, -as, bb, az, -aq, aw, be, -av, ar, -ba, -ba, ar, -av, be, aw, -aq, az, bb, -as, au, -bd, -ax, ap, -ay, -bc, at, -at, bc, ay, -ap, ax, bd, -au, as, -bb, -az, aq, -aw, -be, av, -ar, ba }

{ cc, -bl, bp, -cg, -by, bh, -bt, ck, bu, -bg, bx, ch, -bq, bk, -cb, -cd, bm, -bo, cf, bz, -bi, bs, -cj, -by, bf, -bw, -ci, br, -bj, ca, ce, -bn, bn, -ce, -ca, bj, -br, ci, bw, -bf, bv, cj, -bs, bi, -bz, -cf, bo, -bm, cd, cb, -bk, bq, -ch, -bx, bg, -bu, -ck, bt, -bh, by, cg, -bp, bl, -cc }

{ ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac }

{ cd, -bo, bk, -bz, -ch, bs, -bg, bv, -ck, -bw, bh, -br, cg, ca, -bl, bn, -cc, -ce, bp, -bj, by, ci, -bt, bf, -bu, cj, bx, -bi, bq, -cf, -cb, bm, -bm, cb, cf, -bq, bi, -bx, -cj, bu, -bf, bt, -ci, -by, bj, -bp, ce, cc, -bn, bl, -ca, -cg, br, -bh, bw, ck, -bv, bg, -bs, ch, bz, -bk, bo, -cd }

{ bb, -au, aq, -ax, be, ay, -ar, at, -ba, -bc, av, -ap, aw, -bd, -az, as, -as, az, bd, -aw, ap, -av, bc, ba, -at, ar, -ay, -be, ax, -aq, au, -bb, -bb, au, -aq, ax, -be, -ay, ar, -at, ba, bc, -av, ap, -aw, bd, az, -as, as, -az, -bd, aw, -ap, ay, -bc, -ba, at, -ar, ay, be, -ax, aq, -au, bb }

{ ce, -br, bf, -bs, cf, cd, -bq, bg, -bt, cg, cc, -bp, bh, -bu, ch, cb, -bo, bi, -bv, ci, ca, -bn, bj, -bw, cj, bz, -bm, bk, -bx, ck, by, -bl, bl, -by, -ck, bx, -bk, bm, -bz, -cj, bw, -bj, bn, -ca, -ci, bv, -bi, bo, -cb, -ch, bu, -bh, bp, -cc, -cg, bt, -bg, bq, -cd, -cf, bs, -bf, br, -ce }

{ an, -ak, ah, -aj, am, ao, -al, ai, -ai, al, -ao, -am, aj, -ah, ak, -an, -an, ak, -ah, aj, -am, -ao, al, -ai, ai, -al, ao, am, -aj, ah, -ak, an, an, -ak, ah, -aj, am, ao, -al, ai, -ai, al, -ao, -am, aj, -ah, ak, -an, -an, ak, -ah, aj, -am, -ao, al, -ai, ai, -al, ao, am, -aj, ah, -ak, an }

{ cf, -bu, bj, -bl, bw, -ch, -cd, bs, -bh, bn, -by, cj, cb, -bq, bf, -bp, ca, ck, -bz, bo, -bg, br, -cc, -ci, bx, -bm, bi, -bt, ce, cg, -bv, bk, -bk, bv, -cg, -ce, bt, -bi, bm, -bx, ci, cc, -br, bg, -bo, bz, -ck, -ca, bp, -bf, bq, -cb, -cj, by, -bn, bh, -bs, cd, ch, -bw, bl, -bj, bu, -cf }

{ bc, -ax, as, -aq, av, -ba, -be, az, -au, ap, -at, ay, -bd, -bb, aw, -ar, ar, -aw, bb, bd, -ay, at, -ap, au, -az, be, ba, -av, aq, -as, ax, -bc, -bc, ax, -as, aq, -av, ba, be, -az, au, -ap, at, -ay, bd, bb, -aw, ar, -ar, aw, -bb, -bd, ay, -at, ap, -au, az, -be, -ba, av, -aq, as, -ax, bc }

{ cg, -bx, bo, -bf, bn, -bw, cf, ch, -by, bp, -bg, bm, -bv, ce, ci, -bz, bq, -bh, bl, -bu, cd, cj, -ca, br, -bi, bk, -bt, cc, ck, -cb, bs, -bj, bj, -bs, cb, -ck, -cc, bt, -bk, bi, -br, ca, -cj, -cd, bu, -bl, bh, -bq, bz, -ci, -ce, bv, -bm, bg, -bp, by, -ch, -cf, bw, -bn, bf, -bo, bx, -cg }

{ ag, -af, ae, -ad, ad, -ae, af, -ag, -ag, af, -ae, ad, -ad, ae, -af, ag, ag, -af, ae, -ad, ad, -ae, af, -ag, -ag, af, -ae, ad, -ad, ae, -af, ag, ag, -af, ae, -ad, ad, -ae, af, -ag, -ag, af, -ae, ad, -ad, ae, -af, ag, ag, -af, ae, -ad, ad, -ae, af, -ag, -ag, af, -ae, ad, -ad, ae, -af, ag }

{ ch, -ca, bt, -bm, bf, -bl, bs, -bz, cg, ci, -cb, bu, -bn, bg, -bk, br, -by, cf, cj, -cc, bv, -bo, bh, -bj, bq, -bx, ce, ck, -cd, bw, -bp, bi, -bi, bp, -bw, cd, -ck, -ce, bx, -bq, bj, -bh, bo, -bv, cc, -cj, -cf, by, -br, bk, -bg, bn, -bu, cb, -ci, -cg, bz, -bs, bl, -bf, bm, -bt, ca, -ch }

{ bd, -ba, ax, -au, ar, -ap, as, -av, ay, -bb, be, bc, -az, aw, -at, aq, -aq, at, -aw, az, -bc, -be, bb, -ay, av, -as, ap, -ar, au, -ax, ba, -bd, -bd, ba, -ax, au, -ar, ap, -as, av, -ay, bb, -be, -bc, az, -aw, at, -aq, aq, -at, aw, -az, bc, be, -bb, ay, -av, as, -ap, ar, -au, ax, -ba, bd }

{ ci, -cd, by, -bt, bo, -bj, bf, -bk, bp, -bu, bz, -ce, cj, ch, -cc, bx, -bs, bn, -bi, bg, -bl, bq, -bv, ca, -cf, ck, cg, cb, bw, -br, bm, -bh, bh, -bm, br, -bw, cb, -cg, -ck, cf, -ca, bv, -bq, bl, -bg, bi, -bn, bs, -bx, cc, -ch, -cj, ce, -bz, bu, -bp, bk, -bf, bj, -bo, bt, -by, cd, -ci }

{ ao, -an, am, -al, ak, -aj, ai, -ah, ah, -ai, aj, -ak, al, -am, an, -ao, -ao, an, -am, al, -ak, aj, -ai, ah, -ah, ai, -aj, ak, -al, am, -an, ao, ao, -an, am, -al, ak, -aj, ai, -ah, ah, -ai, aj, -ak, al, -am, an, -ao, -ao, an, -am, al, -ak, aj, -ai, ah, -ah, ai, -aj, ak, -al, am, -an, ao }

{ cj, -cg, cd, -ca, bx, -bu, br, -bo, bl, -bi, bf, -bh, bk, -bn, bq, -bt, bw, -bz, cc, -cf, -ci, ck, -ch, ce, -cb, by, -bv, bs, -bp, bm, -bj, bg, -bg, bj, -bm, bp, -bs, bv, -by, cb, -ce, ch, -ck, ci, -cc, bz, -bw, bt, -bq, bn, -bk, bh, -bf, bi, -bl, bo, -br, bu, -bx, ca, -cd, cg, -cj }

{ be, -bd, bc, -bb, ba, -az, ay, -ax, aw, -av, au, -at, as, -ar, aq, -ap, ap, -aq, ar, -as, at, -au, av, -aw, ax, -ay, az, -ba, bb, -bc, bd, -be, -be, bd, -bc, bb, -ba, az, -ay, ax, -aw, av, -au, at, -as, ar, -aq, ap, -ap, aq, -ar, as, -at, au, -av, aw, -ax, ay, -az, ba, -bb, bc, -bd, be }

{ ck, -cj, ci, -ch, cg, -cf, ce, -cd, cc, -cb, ca, -bz, by, -bx, bw, -bv, bu, -bt, bs, -br, bq, -bp, bo, -bn, bm, -bl, bk, -bj, bi, -bh, bg, -bf, bf, -bg, bh, -bi, bj, -bk, bl, -bm, bn, -bo, bp, -bq, br, -bs, bt, -bu, bv, -bw, bx, -by, bz, -ca, cb, -cc, cd, -ce, cf, -cg, ch, -ci, cj, -ck }

}

-continued where
{ aa, ab, ac, ad, ae, af, ag, ah, ai, aj, ak, al, am, an, ao, ap, aq, ar, as, at, au, av, aw, ax, ay, az, ba, bb, bc, bd, be, bf, bg, bh, bi, bj, bk, bl, bm, bn, bo, bp, bq, br, bs, bt, bu, bv, bw, bx, by, bz, ca, cb, cc, cd, ce, cf, cg, ch, ci, cj, ck} =
{64, 83, 36, 89, 75, 50, 18, 90, 87, 80, 70, 57, 43, 25, 9, 90, 90, 88, 85, 82, 78, 73, 67, 61, 54, 46, 38, 31,
22, 13, 4, 91, 90, 90, 90, 88, 87, 86,
84, 83, 81, 79, 77, 73, 71, 69, 65, 62, 59, 56, 52, 48, 44, 41, 37, 33, 28, 24, 20, 15, 11, 7, 2}

In addition to DCT-2 and 4×4 DST-7 which have been employed in HEVC, an adaptive multiple transform (AMT) scheme has been used in VVC for residual coding of both inter and intra coded blocks. The AMT is also referred to as enhanced multiple transform (EMT) or multiple transform selection (MTS), and uses multiple selected transforms from the DCT/DST families other than the current transforms in HEVC. The newly introduced transform matrices are DST-7 and DCT-8. Table 1 shows exemplary basis functions of the selected DST/DCT.

TABLE 1

| Transform Type | Basis function $T_i(j)$, $i, j = 0, 1, \ldots, N - 1$ |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$ |
| | where $\omega_0 = \begin{cases} \sqrt{\dfrac{2}{N}} & i = 0 \\ 1 & i \neq 0 \end{cases}$ |
| DCT-8 | $T_i(j) = \sqrt{\dfrac{4}{2N+1}} \cdot \cos\left(\dfrac{\pi \cdot (2i+1) \cdot (2j+1)}{4N+2}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

The primary transform matrices in VVC are used with 8-bit representation. The AMT applies to the CUs with both width and height smaller than or equal to 32, and whether AMT applies or not is controlled by a flag called mts_flag. When the mts_flag is equal to 0, only DCT-2 is applied for coding the residue. When the mts_flag is equal to 1, an index mts_idx is further signalled using 2 bins to identify the horizontal and vertical transform to be used according to Table 2, where value 1 means using DST-7 and value 2 means using DCT-8.

TABLE 2

| mts_idx[ xTbY ][ yTbY ][ cIdx ] | trTypeHor | trTypeVer |
|---|---|---|
| −1 | 0 | 0 |
| 0 | 1 | 1 |
| 1 | 2 | 1 |
| 2 | 1 | 2 |
| 3 | 2 | 2 |

An implicit MTS can also be applied (e.g., in VVC) in case the signaling based MTS (i.e., explicit MTS) is not used. With the implicit MTS, the transform selection is made according to a block width and a block height of a coding block instead of signaling. For example, with the implicit MTS, DST-7 is selected for a shorter side of the coding block and DCT-2 is selected for a longer side of the coding block.

The transform core, which is a matrix composed by the basis vectors, of DST-7 can be also represented below:

4-point DST-7:

{ a, b, c, d }
{ c, c, 0, -c }
{ d, -a, -c, b }
{ b, -d, c, -a }
where {a, b, c, d} =
{29, 55, 74, 84}

8-point DST-7:

{ a, b, c, d, e, f, g, h,}
{ c, f, h, e, b, -a, -d, -g,}
{ e, g, b, -c, -h, -d, a, f,}
{ g, c, -d, -f, a, h, b, -e,}
{ h, -a, -g, b, f, -c, -e, d,}
{ f, -e, -a, g, -d, -b, h, -c,}
{ d, -h, e, -a, -c, g, -f, b,}
{ b, -d, f, -h, g, -e, c, -a,}
where {a, b, c, d, e, f, g, h} =
{17, 32, 46, 60, 71, 78, 85, 86}

16-point DST-7:

{ a, b, c, d, e, f, g, h, i, j, k, l, m, n, o, p,}
{ c, f, i, l, o, o, l, i, f, c, 0, -c, -f, -i, -l, -o,}
{ e, j, o, m, h, c, -b, -g, -l, -p, -k, -f, -a, d, i, n,}
{ g, n, l, e, -b, -i, -p, -j, -c, d, k, o, h, a, -f, -m,}
{ i, o, f, -c, -l, -l, -c, f, o, i, 0, -i, -o, -f, c, l,}
{ k, k, 0, -k, -k, 0, k, k, 0, -k, -k, 0, k, k, 0, -k,}
{ m, g, -f, -n, -a, l, h, -e, -o, -b, k, i, -d, -p, -c, j,}
{ o, c, -l, -f, i, i, -f, -l, c, o, 0, -o, -c, l, f, -i,}
{ p, -a, -o, b, n, -c, -m, d, l, -e, -k, f, j, -g, -i, h,}
{ n, -e, -i, j, d, -o, a, m, -f, -h, k, c, -p, b, l, -g,}
{ l, -i, -c, o, -f, -f, o, -c, -i, l, 0, -l, i, c, -o, f,}
{ j, -m, c, g, -p, f, d, -n, i, a, -k, l, -b, -h, o, -e,}
{ h, -p, i, -a, -g, o, -j, b, f, -n, k, -c, -e, m, -l, d,}
{ f, -l, o, -i, c, c, -i, o, -l, f, 0, -f, l, -o, i, -c,}
{ d, -h, l, -p, m, -i, e, -a, -c, g, -k, o, -n, j, -f, b,}
{ b, -d, f, -h, j, -l, n, -p, o, -m, k, -i, g, -e, c, -a,}
where {a, b, c, d, e, f, g, h, i, j, k, l, m, n, o, p} =
{ 9, 17, 25, 33, 41, 49, 56, 62, 66, 72, 77, 81, 83, 87, 89, 90}

32-point DST-7:

{ a, b, c, d, e, f, g, h, i, j, k, l, m, n, o, p, q, r, s, t, u, v, w, x, y, z, A, B, C, D, E, F,}
{ c, f, i, l, o, r, u, x, A, D, F, C, z, w, t, q, n, k, h, e, b, -a, -d, -g, -j, -m, -p, -s, -v, -y, -B, -E,}
{ e, j, o, t, y, D, D, y, t, o, j, e, 0, -e, -j, -o, -t, -y, -D, -D, -y, -t, -o, -j, -e, 0, e, j, o, t, y, D,}
{ g, n, u, B, D, w, p, i, b, -e, -l, -s, -z, -F, -y, -r, -k, -d, c, j, q, x, E, A, t, m, f, -a, -h, -o, -v, -C,}
{ i, r, A, C, t, k, b, -g, -p, -y, -E, -v, -m, -d, e, n, w, F, x, o, f, -c, -l, -u, -D, -z, -q, -h, a, j, s, B,}

-continued

{ k, v, F, u, j, -a, -l, -w, -E, -t, -i, b, m, x, D, s, h, -c, -n, -y, -C, -r, -g, d, o, z, B, q, f, -e, -p, -A,}
{ m, z, z, m, 0, -m, -z, -z, -m, 0, m, z, z, m, 0, -m, -z, -z, -m, 0, m, z, z, m, 0, -m, -z, -z, -m, 0, m, z,}
{ o, D, t, e, -j, -y, -y, -j, e, t, D, o, 0, -o, -D, -t, -e, j, y, y, j, -e, -t, -D, -o, 0, o, D, t, e, -j, -y,}
{ q, E, n, -c, -t, -B, -k, f, w, y, h, -i, -z, -v, -e, l, C, s, b, -o, -F, -p, a, r, D, m, -d, -u, -A, -j, g, x,}
{ s, A, h, -k, -D, -p, c, v, x, e, -n, -F, -m, f, y, u, b, -q, -C, -j, i, B, r, -a, -t, -z, -g, l, E, o, -d, -w,}
{ u, w, b, -s, -y, -d, q, A, f, -o, -C, -h, m, E, j, -k, -F, -l, i, D, n, -g, -B, -p, e, z, r, -c, -x, -t, a, v,}
{ w, s, -d, -A, -o, h, E, k, -l, -D, -g, p, z, c, -t, -v, a, x, r, -e, -B, -n, i, F, j, -m, -C, -f, q, y, b, -u,}
{ y, o, -j, -D, -e, t, t, -e, -D, -j, o, y, 0, -y, -o, j, D, e, -t, -t, e, D, j, -o, -y, 0, y, o, -j, -D, -e, t,}
{ A, k, -p, -v, e, F, f, -u, -q, j, B, a, -z, -l, o, w, -d, -E, -g, t, r, -i, -C, -b, y, m, -n, -x, c, D, h, -s,}
{ C, g, -v, -n, o, u, -h, -B, a, D, f, -w, -m, p, t, -i, -A, b, E, e, -x, -l, q, s, -j, -z, c, F, d, -y, -k, r,}
{ E, c, -B, -f, y, i, -v, -l, s, o, -p, -r, m, u, -j, -x, g, A, -d, -D, a, F, b, -C, -e, z, h, -w, -k, t, n, -q,}
{ F, -a, -E, b, D, -c, -C, d, B, -e, -A, f, z, -g, -y, h, x, -i, -w, j, v, -k, -u, l, t, -m, -s, n, r, -o, -q, p,}
{ D, -e, -y, j, t, -o, -o, t, j, -y, -e, D, 0, -D, e, y, -j, -t, o, o, -t, -j, y, e, -D, 0, D, -e, -y, j, t, -o,}
{ B, -i, -s, r, j, -A, -a, C, -h, -t, q, k, -z, -b, D, -g, -u, p, l, -y, -c, E, -f, -v, o, m, -x, -d, F, -e, -w, n,}
{ z, -m, -m, z, 0, -z, m, m, -z, 0, z, -m, -m, z, 0, -z, m, m, -z, 0, z, -m, -m, z, 0, -z, m, m, -z, 0, z, -m,}
{ x, -q, -g, E, -j, -n, A, -c, -u, t, d, -B, m, k, -D, f, r, -w, -a, y, -p, -h, F, -i, -o, z, -b, -v, s, e, -C, l,}
{ v, -u, -a, w, -t, -b, x, -s, -c, y, -r, -d, z, -q, -e, A, -p, -f, B, -o, -g, C, -n, -h, D, -m, -i, E, -l, -j, F, -k,}
{ t, -y, e, o, -D, j, j, -D, o, e, -y, t, 0, -t, y, -e, -o, D, -j, -j, D, -o, -e, y, -t, 0, t, -y, e, o, -D, j,}
{ r, -C, k, g, -y, v, -d, -n, F, -o, -c, u, -z, h, j, -B, s, -a, -q, D, -l, -f, x, -w, e, m, -E, p, b, -t, A, -i,}
{ p, -F, q, -a, -o, E, -r, b, n, -D, s, -c, -m, C, -t, d, l, -B, u, -e, -k, A, -v, f, j, -z, w, -g, -i, y, -x, h,}
{ n, -B, w, -i, -e, s, -F, r, -d, -j, x, -A, m, a, -o, C, -v, h, f, -t, E, -q, c, k, -y, z, -l, -b, p, -D, u, -g,}
{ l, -x, C, -q, e, g, -s, E, -v, j, b, -n, z, -A, o, -c, -i, u, -F, t, -h, -d, p, -B, y, -m, a, k, -w, D, -r, f,}
{ j, -t, D, -y, o, -e, -e, o, -y, D, -t, j, 0, -j, t, -D, y, -o, e, e, -o, y, -D, t, -j, 0, j, -t, D, -y, o, -e,}
{ h, -p, x, -F, y, -q, i, -a, -g, o, -w, E, -z, r, -j, b, f, -n, v, -D, A, -s, k, -c, -e, m, -u, C, -B, t, -l, d,}
{ f, -l, r, -x, D, -C, w, -q, k, -e, -a, g, -m, s, -y, E, -B, v, -p, j, -d, -b, h, -n, t, -z, F, -A, u, -o, i, -c,}
{ d, -h, l, -p, t, -x, B, -F, C, -y, u, -q, m, -i, e, -a, -c, g, -k, o, -s, w, -A, E, -D, z, -v, r, -n, j, -f, b,}
{ b, -d, f, -h, j, -l, n, -p, r, -t, v, -x, z, -B, D, -F, E, -C, A, -y, w, -u, s, -q, o, -m, k, -i, g, -e, c, -a,}
where {a, b, c, d, e, f, g, h, i, j, k, l, m, n, o, p, q, r, s, t, u, v, w, x, y, z, A, B, C, D, E, F } =
{ 4, 9, 13, 17, 21, 26,
30, 34, 38, 42, 45, 50, 53, 56, 60, 63, 66, 68, 72, 74, 77, 78, 80, 82, 84, 85, 86, 88, 88, 89, 90, 90 }

4-point DCT-8:

{ a, b, c, d,}
{ b, 0, -b, -b,}
{ c, -b, -d, a,}
{ d, -b, a, -c,}
where {a, b, c, d} =
{ 84, 74, 55, 29}

8-point DCT-8:

{ a, b, c, d, e, f, g, h,}
{ b, e, h, -g, -d, -a, -c, -f,}
{ c, h, -e, -a, -f, g, b, d,}
{ d, -g, -a, -h, c, e, -f, -b,}
{ e, -d, -f, c, g, -b, -h, a,}
{ f, -a, g, e, -b, h, d, -c,}
{ g, -c, b, -f, -h, d, -a, e,}
{ h, -f, d, -b, a, -c, e, -g,}
where {a, b, c, d, e, f, g, h} = { 86, 85, 78, 71, 60, 46, 32, 17}

16-point DCT-8:

{ a, b, c, d, e, f, g, h, i, j, k, l, m, n, o, p,}
{ b, e, h, k, n, 0, -n, -k, -h, -e, -b, -b, -e, -h, -k, -n,}
{ c, h, m, -p, -k, -f, -a, -e, -j, -o, n, i, d, b, g, l,}
{ d, k, -p, -i, -b, -f, -m, n, g, a, h, o, -l, -e, -c, -j,}
{ e, n, -k, -b, -h, 0, h, b, k, -n, -e, -e, -n, k, b, h,}
{ f, 0, -f, -f, 0, f, f, 0, -f, -f, 0, f, f, 0, -f, -f,}
{ g, -n, -a, -m, h, f, -o, -b, -l, i, e, -p, -c, -k, j, d,}
{ h, -k, -e, n, b, 0, -b, -n, e, k, -h, -h, k, e, -n, -b,}
{ i, -h, -j, g, k, -f, -l, e, m, -d, -n, c, o, -b, -p, a,}
{ j, -e, -o, a, -n, -f, i, k, -d, -p, b, -m, -g, h, l, -c,}
{ k, -b, n, h, -e, 0, e, -h, -n, b, -k, -k, b, -n, -h, e,}
{ l, -b, i, o, -e, f, -p, -h, c, -m, -k, a, -j, -n, d, -g,}
{ m, -e, d, -l, -n, f, -c, k, o, -g, b, -j, -p, h, -a, i,}
{ n, -h, b, -e, k, 0, -k, e, -b, h, -n, -n, h, -b, e, -k,}
{ o, -k, g, -c, b, -f, j, -n, -p, l, -h, d, -a, e, -i, m,}
{ p, -n, l, -j, h, -f, d, -b, a, -c, e, -g, i, -k, m, -o,}
where {a, b, c, d, e, f, g, h, i, j, k, l, m, n, o, p} =
{ 90, 89, 87, 83, 81, 77, 72, 66, 62, 56, 49, 41, 33, 25, 17, 9}

32-point DCT-8:

{ a, b, c, d, e, f, g, h, i, j, k, l, m, n, o, p, q, r, s, t, u, v, w, x, y, z, A, B, C, D, E, F,}
{ b, e, h, k, n, q, t, w, z, C, F, -E, -B, -y, -v, -s, -p, -m, -j, -g, -d, -a, -c, -f, -i, -l, -o, -r, -u, -x, -A, -D,}
{ c, h, m, r, w, B, 0, -B, -w, -r, -m, -h, -c, -c, -h, -m, -r, -w, -B, 0, B, w, r, m, h, c, c, h, m, r, w, B,}
{ d, k, r, y, F, -A, -t, -m, -f, -b, -i, -p, -w, -D, C, v, o, h, a, g, n, u, B, -E, -x, -q, -j, -c, -e, -l, -s, -z,}
{ e, n, w, F, -y, -p, -g, -c, -l, -u, -D, A, r, i, a, j, s, B, -C, -t, -k, -b, -h, -q, -z, E, v, m, d, f, o, x,}
{ f, q, B, -A, -p, -e, -g, -r, -C, z, o, d, h, s, D, -y, -n, -c, -i, -t, -E, x, m, b, j, u, F, -w, -l, -a, -k, -v,}
{ g, t, 0, -t, -g, -g, -t, 0, t, g, g, t, 0, -t, -g, -g, -t, 0, t, g, g, t, 0, -t, -g, -g, -t, 0, t, g, g, t,}
{ h, w, -B, -m, -c, -r, 0, r, c, m, B, -w, -h, -h, -w, B, m, c, r, 0, -r, -c, -m, -B, w, h, h, w, -B, -m, -c, -r,}
{ i, z, -w, -f, -l, -C, t, c, o, F, -q, -a, -r, E, n, d, u, -B, -k, -g, -x, y, h, j, A, -v, -e, -m, -D, s, b, p,}
{ j, C, -r, -b, -u, z, g, m, F, -o, -e, -x, w, d, p, -E, -l, -h, -A, t, a, s, -B, -i, -k, -D, q, c, v, -y, -f, -n,}
{ k, F, -m, -i, -D, o, g, B, -q, -e, -z, s, c, x, -u, -a, -v, w, b, t, -y, -d, -r, A, f, p, -C, -h, -n, E, j, 1,}
{ l, -E, -h, -p, A, d, t, -w, -a, -x, s, e, B, -o, -i, -F, k, m, -D, -g, -q, z, c, u, -v, -b, -y, r, f, C, -n, -j,}
{ m, -B, -c, -w, r, h, 0, -h, -r, w, c, B, -m, -m, B, c, w, -r, -h, 0, h, r, -w, -c, -B, m, m, -B, -c, -w, r, h,}
{ n, -y, -c, -D, i, s, -t, -h, E, d, x, -o, -m, z, b, C, -j, -r, u, g, -F, -e, -w, p, l, -A, -a, -B, k, q, -v, -f,}
{ o, -v, -h, C, a, D, -g, -w, n, p, -u, -i, B, b, E, -f, -x, m, q, -t, -j, A, c, F, -e, -y, l, r, -s, -k, z, d,}
{ p, -s, -m, v, j, -y, -g, B, d, -E, -a, -F, C, C, -f, -z, i, w, -l, -t, o, q, -r, -n, u, k, -x, -h, A, e, -D, -b,}
{ q, -p, -r, o, s, -n, -t, m, u, -l, -v, k, w, -j, -x, i, y, -h, -z, g, A, -f, -B, e, C, -d, -D, c, E, -b, -F, a,}

-continued

{ r, −m, −w, h, B, −c, 0, c, −B, −h, w, m, −r, −r, m, w, −h, −B, c, 0, −c, B, h, −w, −m, r, r, −m, −w, h, B, −c,}
{ s, −j, −B, a, −C, −i, t, r, −k, −A, b, −D, −h, u, q, −l, −z, c, −E, −g, v, p, −m, −y, d, −F, −f, w, o, −n, −x, e,}
{ t, −g, 0, g, −t, −t, g, 0, −g, t, t, −g, 0, g, −t, −t, g, 0, −g, t, t, −g, 0, g, −t, −t, g, 0, −g, t, t, −g,}
{ u, −d, B, n, −k, −E, g, −r, −x, a, −y, −q, h, −F, −j, o, A, −c, v, t, −e, C, m, −l, −D, f, −s, −w, b, −z, −p, i,}
{ v, −a, w, u, −b, x, t, −c, y, s, −d, z, r, −e, A, q, −f, B, p, −g, C, o, −h, D, n, −i, E, m, −j, F, l, −k,}
{ w, −c, r, B, −h, m, 0, −m, h, −B, −r, c, −w, −w, c, −r, −B, h, −m, 0, m, −h, B, r, −c, w, w, −c, r, B, −h, m,}
{ x, −f, m, −E, −q, b, −t, −B, j, −i, A, u, −c, p, F, −n, e, −w, −y, g, −l, D, r, −a, s, C, −k, h, −z, −v, d, −o,}
{ y, −i, h, −x, −z, j, −g, w, A, −k, f, −v, −B, l, −e, u, C, −m, d, −t, −D, n, −c, s, E, −o, b, −r, −F, p, −a, q,}
{ z, −l, c, −q, E, u, −g, h, −v, −D, p, −b, m, −A, −y, k, −d, r, −F, −t, f, −i, w, C, −o, a, −n, B, x, −j, e, −s,}
{ A, −o, c, −j, v, F, −t, h, −e, q, −C, −y, m, −a, l, −x, −D, r, −f, g, −s, E, w, −k, b, −n, z, B, −p, d, −i, u,}
{ B, −r, h, −c, m, −w, 0, w, −m, c, −h, r, −B, −B, r, −h, c, −m, w, 0, −w, m, −c, h, −r, B, B, −r, h, −c, m, −w,}
{ C, −u, m, −e, d, −l, t, −B, −D, v, −n, f, −c, k, −s, A, E, −w, o, −g, b, −j, r, −z, −F, x, −p, h, −a, i, −q, y,}
{ D, −x, r, −l, f, −a, g, −m, s, −y, E, C, −w, q, −k, e, −b, h, −n, t, −z, F, B, −v, p, −j, d, −c, i, −o, u, −A,}
{ E, −A, w, −s, o, −k, g, −c, b, −f, j, −n, r, −v, z, −D, −F, B, −x, t, −p, l, −h, d, −a, e, −i, m, −q, u, −y, C,}
{ F, −D, B, −z, x, −v, t, −r, p, −n, l, −j, h, −f, d, −b, a, −c, e, −g, i, −k, m, −o, q, −s, u, −w, y, −A, C, −E,}
where {a, b, c, d, e, f, g, h, i, j, k, l, m, n, o, p, q, r, s, t, u, v, w, x, y, z, A, B, C, D, E, F } =
{90, 90, 89, 88, 88, 86, 85, 84, 82, 80, 78, 77, 74, 72, 68, 66, 63, 60, 56, 53, 50, 45, 42, 38, 34, 30, 26, 21, 17, 13, 9, 4}

When both the height and width of the coding block are smaller than or equal to 64, the transform size is the same as the coding block size, such as in VVC. When either the height or width of the coding block is larger than 64, for performing the transform or intra prediction, the coding block is further split into multiple sub-blocks, where the width and height of each sub-block are smaller than or equal to 64, and one transform is performed on each sub-block.

IV. Non-Separable Secondary Transform (NSST)

A mode-dependent non-separable secondary transform (NSST) can be applied between the forward core transform (i.e., primary transform) and quantization (at the encoder) and between the de-quantization and inverse core transform (at the decoder). To keep low complexity, NSST is only applied to low frequency coefficients after the primary transform. If both width (W) and height (H) of a transform coefficient block are larger than or equal to 8, then 88 non-separable secondary transform is applied to the top-left 88 region of the transform coefficients block. Otherwise, if either W or H of the transform coefficient block is equal to 4, a 4×4 non-separable secondary transform is applied and the 4×4 non-separable secondary transform is performed on the top-left min(8,W)×min(8,H) region of the transform coefficient block. The above transform selection rule is applied for both luma and chroma components.

Matrix multiplication implementation of a non-separable transform is described as follows using a 4×4 input block as an example. To apply the non-separable transform, the 4×4 input block X in Eq. 1 can be represented as a vector $\vec{X}$ in Eq. 2.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{Eq. 1}$$

$$\vec{X} = [X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T \quad \text{Eq. 2}$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as a 4×4 block using the scanning order for the block (horizontal, vertical or diagonal). A coefficient with a smaller index can be placed with a smaller scanning index in the 4×4 coefficient block. In an example, a hypercube-givens transform (HyGT) with butterfly implementation is used instead of matrix multiplication to reduce the complexity of non-separable transform.

In one embodiment, there can be totally 35×3 non-separable secondary transforms for both 4×4 and 8×8 block sizes in NSST, where 35 is the total number of transform sets and 3 is the number of NSST candidates included in each transform set. Each transform set is specified by an intra prediction mode. The mapping from the intra prediction mode to the corresponding transform set is defined in Table 3. The transform set applied to luma/chroma transform coefficients is specified by the corresponding luma/chroma intra prediction modes, according to Table 3. For intra prediction modes larger than 34 (diagonal prediction direction), the transform coefficient block is transposed before/after the secondary transform at the encoder/decoder.

TABLE 3

| Intra Mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Transform Set | 0 | 1 | 2 | 3 | 4 | 5 | 6 | 7 | 8 | 9 | 10 | 11 | 12 | 13 | 14 | 15 | 16 |
| Intra Mode | 17 | 18 | 19 | 20 | 21 | 22 | 23 | 24 | 25 | 26 | 27 | 28 | 29 | 30 | 31 | 32 | 33 |
| Transform Set | 17 | 18 | 19 | 20 | 21 | 22 | 23 | 24 | 25 | 26 | 27 | 28 | 29 | 30 | 31 | 32 | 33 |
| Intra Mode | 34 | 35 | 36 | 37 | 38 | 39 | 40 | 41 | 42 | 43 | 44 | 45 | 46 | 47 | 48 | 49 | 50 |
| Transform Set | 34 | 33 | 32 | 31 | 30 | 29 | 28 | 27 | 26 | 25 | 24 | 23 | 22 | 21 | 20 | 19 | 18 |
| Intra Mode | 51 | 52 | 53 | 54 | 55 | 56 | 57 | 58 | 59 | 60 | 61 | 62 | 63 | 64 | 65 | 66 | 67 |
| Transform Set | 17 | 16 | 15 | 14 | 13 | 12 | 11 | 10 | 9 | 8 | 7 | 6 | 5 | 4 | 3 | 2 | NULL |

For each transform set, the selected non-separable secondary transform candidate is further specified by an explicitly signalled CU-level NSST index. The NSST index is signalled in a bitstream once per intra CU after transform coefficients and truncated unary binarization are used. The truncated value is 2 in case of planar or DC mode, and 3 for an angular intra prediction mode. The NSST index is signalled only when there is more than one non-zero coefficient in a CU. The default value is zero when the NSST index is not signalled. Zero value of this syntax element indicates the secondary transform is not applied to the current CU, values 1-3 indicates which secondary transform from the transform set can be applied.

In an embodiment, NSST may be not applied for a block coded with transform skip mode. When the NSST index is signalled for a CU and not equal to zero, NSST is not used for a block of a component that is coded with transform skip mode in the CU. When a CU with blocks of all components are coded in transform skip mode or the number of non-zero coefficients of non-transform-skip mode CBs is less than 2, the NSST index is not signalled for the CU.

V. Reduced Size Transform (RST)

In an embodiment, NSST can use a transform zero-out scheme, namely reduced size transform (RST), which is also referred to as low-frequency non-separable secondary transform (LFNST) in some related cases such as VVC Draft 5. The RST checks whether the intra prediction mode is planar or DC for entropy coding the transform index of NSST.

In RST, a total of 4 transform sets are applied, and each transform set includes three RST transform cores. A size of a RST transform core can be either 16×48 (or 16×64) (applied for transform coefficient block with height and width both being greater than or equal to 8) or 16×16 (applied for transform coefficient block with either height or width being equal to 4). For notational convenience, the 16×48 (or 16×64) transform is denoted as RST8×8 and the 16×16 transform is denoted as RST4×4.

Figure 9:
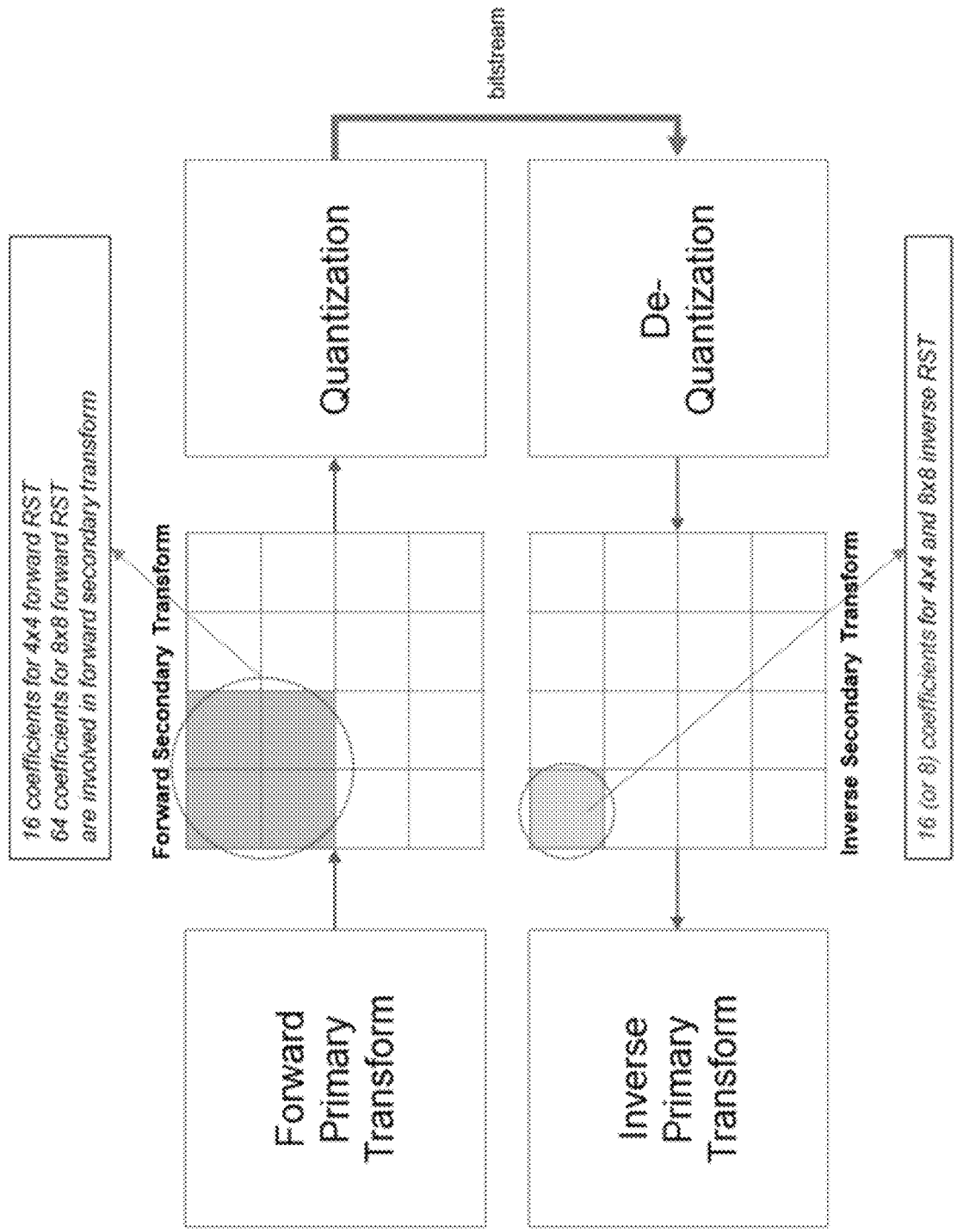
FIG. 9 shows an exemplary 16×64 transform core according to an embodiment of the disclosure.
Figure 10:
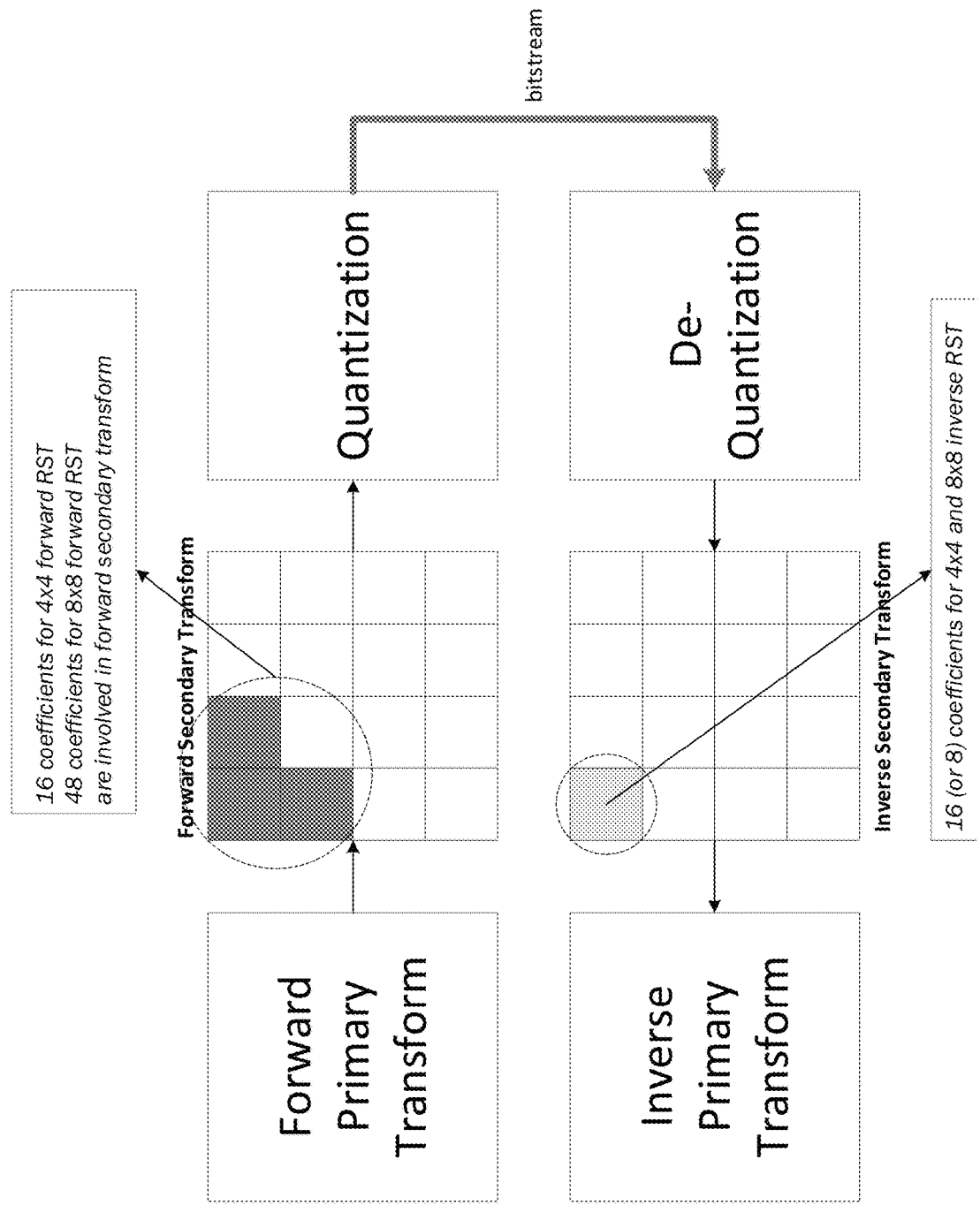
FIG. 10 shows an exemplary 16×48 transform core according to an embodiment of the disclosure.

For RST8×8, two exemplary alternatives using 16×64 transform cores and 16×48 transform cores are shown in FIG. 9 and FIG. 10, respectively. In an example, the one using 16×48 transform cores is employed.

VI. Computation of RST

RST is to map an N dimensional vector to an R dimensional vector in a different space, where R/N (R<N) is a reduction factor. The RST matrix is an R×N matrix as shown in FIG. 11, where the R rows of the transform are R bases of the N dimensional space. The inverse transform matrix for RT is the transpose of its forward transform. FIGS. 12A and 12B show a simplified reduced transform and a simplified reduced inverse transform, respectively.

In an embodiment, the RST8×8 with a reduction factor of 4 (¼ size) is applied. Hence, instead of 64×64, which is a typical 8×8 non-separable transform matrix size, a 16×64 direct matrix is used in the RST8×8. In other words, the 64×16 inverse RST matrix is used at the decoder side to generate core (primary) transform coefficients in an 8×8 top-left region, as shown in FIG. 13A. The forward RST8×8 uses 16×64 (or 8×64 for an 8×8 block) matrices so that it produces non-zero coefficients only in the top-left 4×4 region within the given 8×8 region. In other words, if RST is applied, then the 8×8 region except the top-left 4×4 region will have only zero coefficients. For RST4×4, 16×16 (or 8×16 for a 4×4 block) direct matrix multiplication is applied.

Figure 13B:
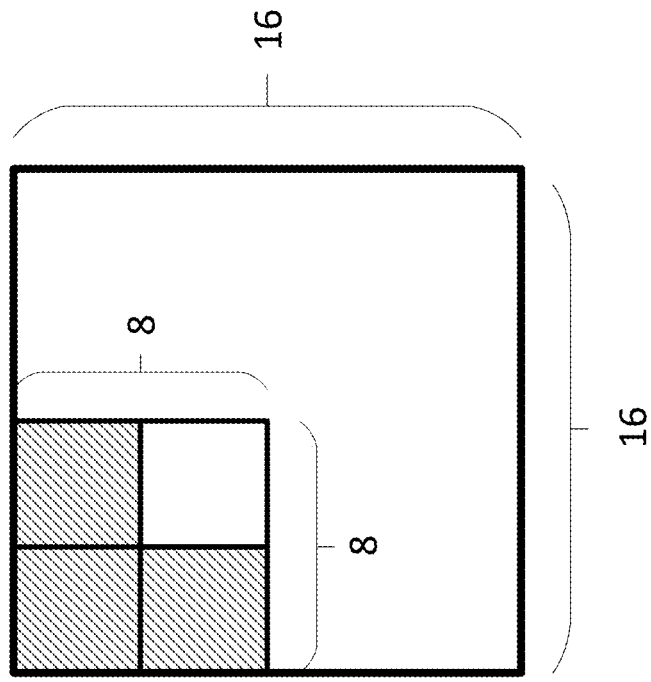
FIGS. 13A and 13B show two exemplary alternatives of RST8×8 in some examples, respectively.
Figure 13A:
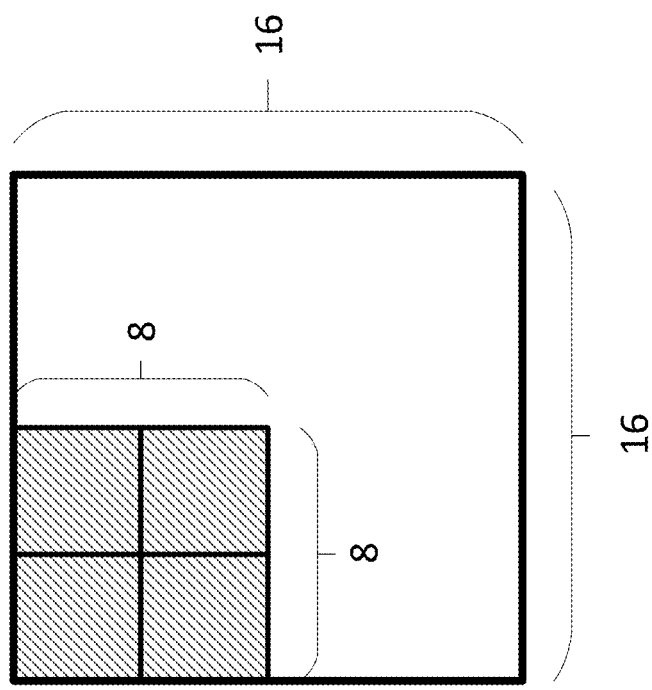

In addition, for RST8×8, to further reduce the transform matrix size, instead of the using the whole top-left 8×8 coefficients as input for calculating secondary transform, the top-left three 4×4 coefficients are used as the input for calculating secondary transform, as shown in FIG. 13B.

An inverse RST is conditionally applied when the following two conditions are satisfied: (1) block size is greater than or equal to a given threshold (e.g., W>=4 && H>=4); and (2) transform skip mode flag is equal to zero.

If both width (W) and height (H) of a transform coefficient block is greater than 4, then the RST8×8 is applied to the top-left 8×8 region of the transform coefficient block. Otherwise, the RST4×4 is applied on the top-left min(8, W)×min(8, H) region of the transform coefficient block.

If RST index is equal to 0, RST is not applied. Otherwise, RST is applied and an RST kernel is chosen with the RST index.

Furthermore, RST can be applied for intra CUs in both intra and inter slices, and for both luma and chroma. If a dual tree is enabled, RST indices for luma and chroma are signaled separately. For an inter slice in which the dual tree is disabled, a single RST index is signaled and used for both luma and chroma. When intra sub-partition (ISP) mode is selected, RST is disabled, and the RST index is not signaled.

An RST matrix is chosen from four transform sets, each of which includes two transforms. Which transform set is applied is determined by the intra prediction mode as the following: if one of three cross-component linear model (CCLM) modes is indicated, transform set 0 is selected; otherwise, transform set selection is performed according to Table 4. The index IntraPredMode has a range of [−14, 83], which is a transformed mode index used for wide angle intra prediction.

TABLE 4

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

VII. Memory Cost of RST

According to aspects of the disclosure, eight (4×2) 16×16 transform matrices (RST4×4) and eight (4×2) 16×48 transform matrices (RST8×8) are utilized in RST (or LFNST, or NSST), and each element in one transform matrix is represented using 8-bit integers. Accordingly, a total of 4×2×(256+768)=8K bytes memory is required in RST, which is relatively expensive for hardware design. This is because two transform processes are used in RST, i.e., RST4×4 and RST8×8. In addition, using different sizes of transform cores may not be a unified solution since a switching of transform cores is needed in RST.

In addition, in some related examples, the secondary transform index in RST is signaled after residual coding. That is, the RST index is not available until all residual coefficients are parsed. This may cause latency since the secondary transform cannot be started until the RST index is available.

VIII. Alternative of LFNST

The current LFNST method incurs relative high encoder search burden since the encoder has to try three options (e.g., no LFNST, LFNST index 1, and LFNST index 2) and then picks up the most efficient candidate per block.

Instead of two candidates, only one candidate of LFNST can be used and signaled for each block (e.g., in JVET-O0292 and JVET-O0350), as shown in Table 5. In Table 5, the LFSNT index signaled in the bitstream is denoted as lfnstIdx, the selected LFNST core index in the given transform set is denoted as coreIdx, and intra prediction mode is denoted as intraMode.

TABLE 5

| | VTM-6 | JVET-O0292 | JVET-O0349 |
|---|---|---|---|
| lfnstIdx 0 | No LFNST | No LFNST | No LFNST |
| lfnstIdx 1 | lfnstIdx = 1 | If intraMode <35 coreIdx = intraMode % 2 == 0 ? 1:2 Otherwise, coreIdx = intraMode % 2 == 0 ? 2:1 | coreIdx = ( intramode % 2) + 1 |
| lfnstIdx 2 | lfnstIdx = 2 | — | — |

With the method proposed in JVET-O0292 and JVET-O0350, only one LFNST candidate remains but the scheme still supports selecting all the LFNST candidates, for example, as defined in the current VVC Draft 6. Since only one LFNST candidate is kept, the burden of selecting LFNST at the encoder is reduced.

However, the proposed method in JVET-O0292 and JVET-O0350 requires normatively dropping the second LFNST candidate, and thus is risky since the coding performance relies on how the encoder search is designed. For example, if the encoder drops lfnstIdx 2 to achieve a similar encoder speedup as reported by JVET-O0292 and JVET-O0350, there can be a significant coding loss since the second LFNST candidate can never be chosen.

IX. Unified Secondary Transform

The following application includes various unified secondary transform methods for reducing memory cost of the secondary transform and improving performance of the secondary transform.

It is noted that LFNST will be discussed as an example in the methods, but the methods can also be applied to other transforms such as NSST or RST. In addition, a TU refers to a unit on which a transform process is performed. A TU may include multiple color components, and each color component is represented as a TB. Therefore, a TU can include multiple TBs.

According to aspects of the disclosure, the LFNST transform core applied on blocks with sizes being greater than or equal to M×N (RSTM×N) can also be applied on smaller blocks with either block width being smaller than M or block height being smaller than N. Exemplary values of M include but are not limited to 8, 16 and 32, and exemplary values of N include but are not limited to 8, 16 and 32.

In one embodiment, taking M=N=8 as an example, in order to apply the forward LFNST on a W×H primary transform coefficient block with either height (H) or width (W) being smaller than 8, an 8×8 block is first initialized as all 0. Then for each coordinate position, a value of this 8×8 block is set as a value located at a same coordinate of the W×H primary transform coefficient block. Finally, this 8×8 block is input to the RST8×8 transform process using RST8×8 transform cores, and the output is used as the output of the secondary transform applied on the W×H primary transform coefficient block.

Figure 14:
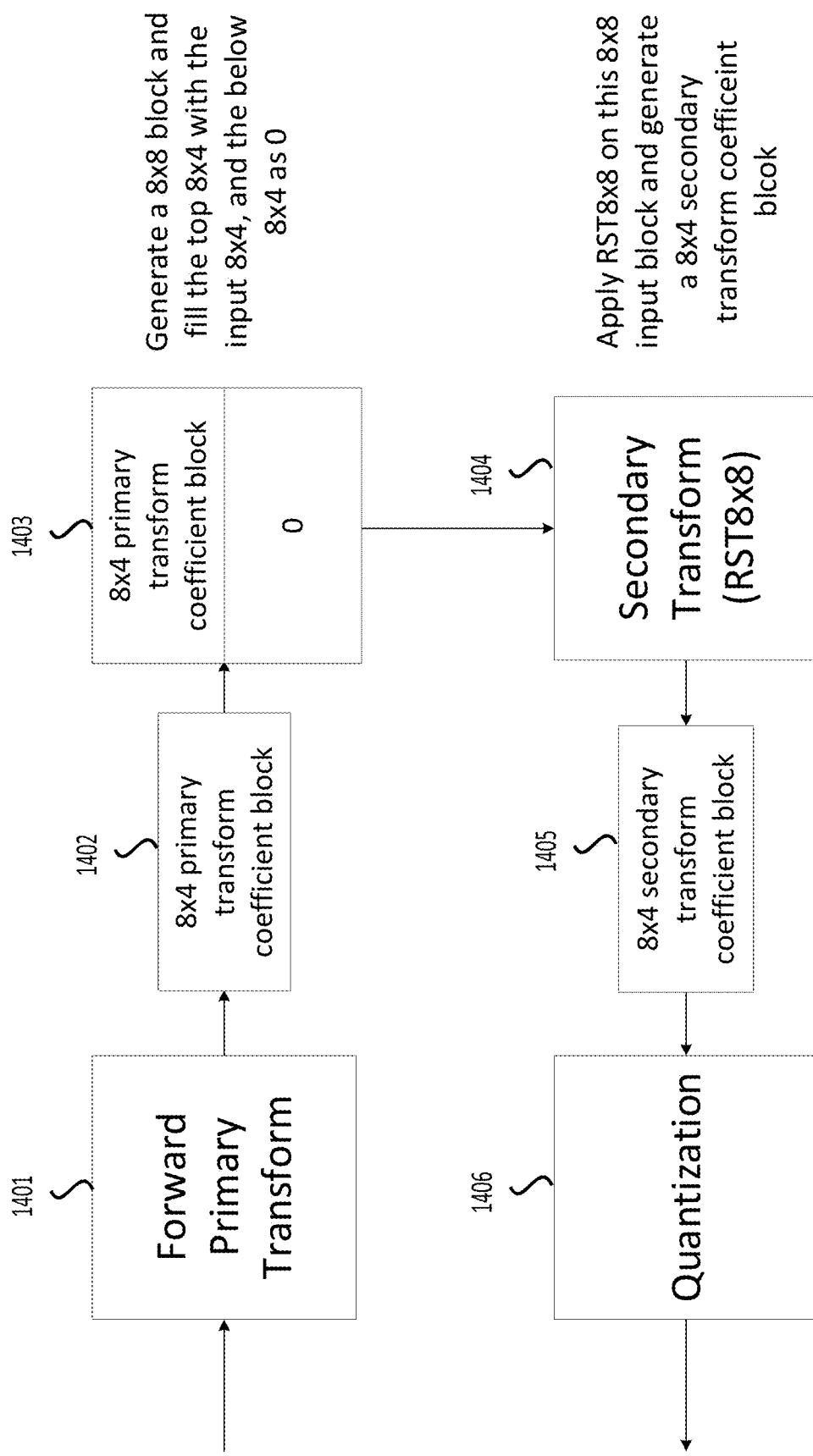
FIG. 14 shows an exemplary unified secondary transform according to an embodiment of the disclosure.

FIG. 14 shows an exemplary unified secondary transform according to an embodiment of the disclosure. In FIG. 14, an 8×4 TU is first processed by the forward primary transform 1401, and then an 8×4 primary transform coefficient block 1402 is output from the forward primary transform 1401. An 8×8 block 1403 is generated based on the 8×4 primary transform coefficient block 1402. A top 8×4 region of the 8×8 block 1403 is directly copied from the 8×4 primary transform coefficient block 1402 and a bottom 8×4 region of the 8×8 block 1403 is set as 0. Then the 8×8 block 1403 is input to a secondary transform 1404 (e.g., RST8×8). The output of the secondary transform 1404 is an 8×4 secondary transform coefficient block 1405, which is further input to a quantization process 1406.

In another embodiment, taking both M and N being 8 as an example, in order to apply the inverse LFNST on a W×H primary transform coefficient block with height (H) or width (W) being smaller than 8, given the input which is a vector of secondary transform coefficients, an 8×8 primary transform coefficient block can be generated. However, only an overlapping part between the W×H block and the 8×8 block is calculated and a non-overlapping part is not calculated because of being located out of a coordinate range of the W×H block.

Figure 15:
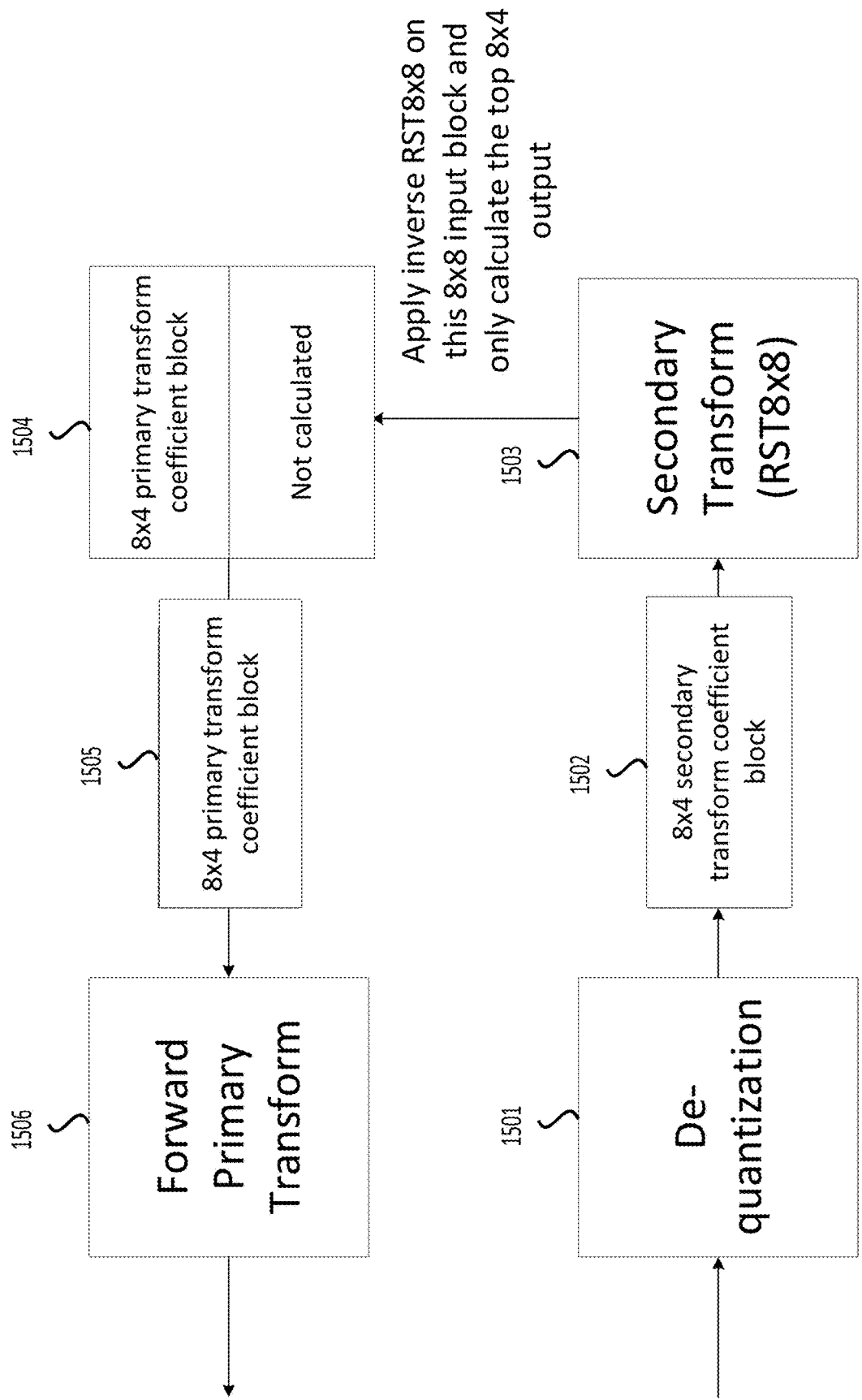
FIG. 15 shows an exemplary unified secondary transform according to an embodiment of the disclosure.

FIG. 15 shows an exemplary unified secondary transform according to an embodiment of the disclosure. In FIG. 15, an 8×4 secondary transform coefficient block 1502 is first output from a de-quantization block 1501 and then input to an inverse secondary transform 1503 (e.g., inverse RST8×8). Only a top 8×4 region of the inverse secondary transform 1503 is applied on the 8×4 secondary transform coefficient block 1502 and a bottom 8×4 region of the inverse secondary transform 1503 is not calculated. Therefore, an 8×8 block 1504 is output from the inverse secondary transform 1503, and a top 8×4 region of the 8×8 block 1504 is used as an 8×4 primary transform coefficient block 1505 and input to a forward primary transform 1506.

According to aspects of the disclosure, the present LFNST schemes above can be applied on any block sizes with a height and/or a width being smaller than a threshold (e.g., 8). For example, the present LFNST schemes above can be applied on 2×H blocks, W×2 blocks, 6×H blocks, and W×6 blocks.

In one embodiment, the disclosed unified LFNST scheme can be applied to chomra TUs, such as 2×H and W×2 chroma TUs. If H (or W) is less than or equal to 8, only a first number of coefficients (e.g., the first 8 coefficients) such as along a forward scanning order (e.g., scanning from low-frequency to high frequency) are kept and remaining coefficients are set or considered as 0, regardless of the secondary transform having any impact or not. If H (or W) is greater than 8, only a second number of coefficients (e.g., the first 16 coefficients) such as along the forward scanning order are kept and remaining coefficients are set or considered as 0, regardless of the secondary transform having any impact or not.

In one embodiment, for certain block sizes (e.g., 8×4 and 4×8 blocks), when performing LFNST, only up to a predetermined number of transform coefficients (e.g., only up to 8 transform coefficients) are calculated and remaining coefficients are set as 0. For example, the predetermined number of transform coefficients can be the last predetermined number of coefficient positions in a coefficient parsing order.

In one embodiment, for certain block sizes (e.g., 8×4 and 4×8 blocks), in case a non-zero coefficient is identified from a certain position, for example an 8th position (inclusive) along the forward coefficient scanning order, a secondary transform index is not signaled and a secondary transform is not applied.

In one embodiment, for certain block sizes (e.g., N×4 and 4×N blocks), where N is greater than 8, instead of performing two RST4×4, only one RST8×8 is performed, and the disclosed unified LFNST scheme can generate up to 16 nonzero coefficients instead of up to 32 nonzero coefficients.

In one embodiment, if the secondary transform index is signaled before transform coefficients, a modified coefficient coding scheme is employed. For an M×N TU, when M and N are both less than or equal to 8 but greater than 2, only the first 8 coefficients along the scanning order are coded, syntax elements of the remaining coefficients (e.g., significance flag) are not coded. When both M and N are greater than 4, only the first 16 coefficients along the scanning order are coded, syntax elements of the remaining coefficients (e.g., CG flag, significance flag) are not coded.

According to aspects of the disclosure, an LFNST index is signaled at a TB-level. That is, each TB or each color component of one TU corresponds to an individual LFNST index.

In one embodiment, the LFNST index is signaled after a last position (e.g., a last non-zero transform coefficient in the transform coefficient block) and before one or more coefficient coding related syntax, such as CG flags (coded_sub_block_flag), significance flags (sig_coeff_flag), gtX flags (abs_level_gtx_flag), parity flags (par_level_flag), sign flags (coeff_sign_flag), and/or absolute remainder levels (abs_remainder).

In one embodiment, depending on the signaled LFNST index value and a position of a coefficient to be coded, one or more coefficient coding related syntax may be skipped and not signaled and derived as a default value.

In one embodiment, the one or more coefficient coding related syntax which may be skipped and not signaled include CG flags (coded_sub_block_flag), significance flags (sig_coeff_flag), gtX flags (abs_level_gtx_flag), parity flags (par_level_flag), sign flags (coeff_sign_flag), and/or absolute remainder levels (abs_remainder).

In one embodiment, the coding related syntax which is skipped and not signaled can be derived as 0 which indicates the associated coefficient is 0.

In one embodiment, when the signaled LFNST index indicates that LFNST is applied, one or more coefficient coding related syntax may be not signaled and derived as a default value. The one or more coefficient coding related syntax which may be skipped and not signaled include CG flags (coded_sub_block_flag), significance flags (sig_coeff_flag), gtX flags (abs_level_gtx_flag), parity flags (par_level_flag), sign flags (coeff_sign_flag), and/or absolute remainder levels (abs_remainder).

In one embodiment, for a current TB with a size of W×H, where both W and H are smaller than or equal to a threshold (e.g., 8), if the LFNST index is applied on the current TB, the CG flag for the first CG is still signaled, but other syntax elements (e.g., sig_coeff_flag, abs_level_gtx_flag, par_level_flag, coeff_sign_flag, and/or abs_remainder) for a coefficient located after the Nth (for example 8th) position along the scanning order are not signaled and derived as a default value. The default value may be a value indicating that the coefficient is 0.

In one embodiment, for a current TB with a size of W×H, where either W or H is greater than a threshold like 8, if the LFNST index is applied on the current TB, the coefficient coding related syntax elements for a coefficient located after the first CG along the scanning order are not signaled and derived as a default value. The default value may be a value indicating that the coefficients within the associated CG are all 0.

In one embodiment, if the LFNST index is applied on the current TB, the coefficient coding related syntax elements for a coefficient located after the first CG along the scanning order are not signaled and derived as a default value. The default value may be a value indicating that the coefficients within the associated CG are all 0.

According to aspects of the disclosure, the syntax element tu_mts_idx is signalled after a last position position (e.g., a last non-zero transform coefficient in the transform coefficient block) and before one or more coefficient coding related syntax, such as CG flags (coded_sub_block_flag), significance flags (sig_coeff_flag), gtX flags (abs_level_gtx_flag), parity flags (par_level_flag), sign flags (coeff_sign_flag), and/or absolute remainder levels (abs_remainder).

In one embodiment, the syntax element tu_mts_idx is signalled after the last position and before the LFNST index and also before some coefficient coding related syntax, such as CG flags (coded_sub_block_flag), significance flags (sig_coeff_flag), gtX flags (abs_level_gtx_flag), parity flags (par_level_flag), sign flags (coeff_sign_flag), and/or absolute remainder levels (abs_remainder).

According to aspects of the disclosure, context used for entropy coding of the LFNST index depends on a shape of the LFNST kernel. The context used can depend on a comparison of a block width or height to a value (e.g., 4).

In one embodiment, depending on whether the block width or height is the value (e.g., 4), different contexts may be applied for entropy coding of the LFNST index.

In one embodiment, depending on whether either the block width or height is greater than the value (e.g., 4), different contexts may be applied for entropy coding of the LFNST index.

According to aspects of the disclosure, for one-dimensional cross-component linear model (CCLM) mode CCLM_TOP, which uses only top reference samples for deriving CCLM model parameters, and CCLM_LEFT, which uses only left reference samples for deriving CCLM model parameters, a decision on whether an output of the inverse LFNST (or an input of the forward LFNST) is transposed is different.

In one embodiment, for CCLM_TOP mode, the output of the inverse LFNST (or the input of the forward LFNST) is transposed, but for CCLM_LEFT mode, the output of the inverse LFNST (or the input of the forward LFNST) is not transposed.

In one embodiment, for CCLM_TOP mode, the output of the inverse LFNST (or the input of the forward LFNST) is not transposed, but for CCLM_LEFT mode, the output of the inverse LFNST (or the input of the forward LFNST) is transposed.

According to aspects of the disclosure, for one block, a transform set is first identified. The transform set includes N LFNST candidates. Then an LFNST index value is signaled in the bitstream, i.e., lfnstIdx, which ranges from 1~N. When lfnstIdx is equal to 0, LFNST is not applied. lfnstIdx is mapped to one of the N candidates in the given transform set, specifying which LFNST core is selected for the signaled lfnstIdx value. For adjacent intra prediction modes, the same transform set is applied, but lfnstIdx is mapped to a different LFNST candidate in the given transform set.

In one embodiment, the transform set includes two LFNST candidates, i.e., N is equal to 2, and lfnstIdx is mapped according to Table 6. For example, intraMode 2 and intraMode 3 may share a same transform set. For intraMode 2, the lfnstIdx 1 and lfnstIdx 2 refer to a first candidate and a second candidate in the given transform set, respectively; while for intraMode 3, the lfnstIdx 1 and lfnstIdx 2 refer to the second candidate and first candidate in the given transform set, respectively.

TABLE 6

|  | VTM-6 | Proposed in This Disclsoure |
| --- | --- | --- |
| lfnstIdx 0 | LFNST off | LFNST off |
| lfnstIdx 1 | 1 | 1 + ( intraMode %2) |
| lfnstIdx 2 | 2 | 2 − ( intraMode %2) |

In one embodiment, the transform set includes two LFNST candidates, i.e., N equal to 2, and lfnstIdx is mapped according to Table 7. For example, intraMode 2 and intraMode 3 may share a same transform set. Since both intraMode 2 and intraMode 3 are less than a threshold (e.g., 35), for intraMode 2, the lfnstIdx 1 and lfnstIdx 2 refer to a first and a second candidate in the given transform set, respectively; while for intraMode 3, the lfnstIdx 1 and lfnstIdx 2 refer to the second candidate and first candidate in the given transform set, respectively.

TABLE 7

|  | VTM-6 | Proposed in This Disclosure |
|---|---|---|
| lfnstIdx 0 | No LFNST | No LFNST |
| lfnstIdx 1 | 1 | If intraMode <35<br>coreIdx = intraMode %2 == 0 ? 1:2<br>Otherwise,<br>coreIdx = intraMode %2 == 0 ? 2:1 |
| lfnstIdx 2 | 2 | If intraMode <35<br>coreIdx = intraMode %2 == 0 ? 2:1<br>Otherwise,<br>coreIdx = intraMode %2 == 0 ? 1:2 |

According to aspects of the disclosure, a same transform set and a same transform selection scheme for LFNST can be applied. However, a context for entropy coding bins of the LFNST index depends on whether the intra prediction mode is an even or odd number, and/or whether the intra prediction mode is greater than a threshold (e.g., a diagonal intra prediction mode index 34 in VVC Draft 6).

According to aspects of the disclosure, the coreIdx derivation methods described above may be used as a prediction (or error prediction) of the current block. As there are only two options for such a prediction, lfnstIdx may be indicated in bitstreams by signaling whether the prediction is correct or not.

In an embodiment, two bins of a binarization for lfnstIdx 1 and lfnstIdx 2 are 10 and 11, respectively. Since a first bin is always 1, a second bin of the two bins can be used for indicating whether the prediction is correct or not. For example, if lfnstIdx 1 is chosen and the second bin is 0, the prediction is right; if lfnstIdx 1 is chosen and the second bin is 1, the prediction is wrong.

X. Modified Residual Coding Syntax

Table 8 shows an exemplary modified residual coding syntax according to an embodiment of the disclosure.

TABLE 8

|  | Descriptor |
|---|---|
| residual_coding( x0, y0, log2TbWidth, log2TbHeight, cIdx ) {<br>  if( ( tu_mts_idx[ x0 ][ y0 ] > 0 \|\|<br>    ( cu_sbt_flag && log2TbWidth < 6 && log2TbHeight < 6 ) )<br>    && cIdx = = 0 && log2TbWidth > 4 )<br>    log2ZoTbWidth = 4<br>  else<br>    log2ZoTbWidth = Min( log2TbWidth, 5 )<br>  if( tu_mts_idx[ x0 ][ y0 ] > 0 \|\|<br>    ( cu_sbt_flag && log2TbWidth < 6 && log2TbHeight < 6 ) )<br>    && cIdx = = 0 && log2TbHeight > 4)<br>    log2ZoTbHeight = 4<br>  else<br>    log2ZoTbHeight = Min( log2TbHeight, 5 )<br>  if( log2TbWidth > 0 )<br>    last_sig_coeff_x_prefix |  |
|  | ae(v) |
|   if( log2TbHeight > 0 )<br>    last_sig_coeff_y_prefix |  |
|  | ae(v) |
|   if( last_sig_coeff_x_prefix > 3 )<br>    last_sig_coeff_x_suffix |  |
|  | ae(v) |
|   if( last_sig_coeff_y_prefix > 3 )<br>    last_sig_coeff_y_suffix |  |
|  | ae(v) |
|   log2TbWidth = log2ZoTbWidth<br>  log2TbHeight = log2ZoTbHeight<br>  log2SbW = ( Min( log2TbWidth, log2TbHeight ) < 2 ? 1 : 2 )<br>  log2SbH = log2SbW<br>  if( log2TbWidth + log2TbHeight > 3 ) {<br>    if( log2TbWidth < 2 ) {<br>      log2SbW = log2TbWidth<br>      log2SbH = 4 − log2SbW<br>    } else if( log2TbHeight < 2 ) {<br>      log2SbH = log2TbHeight<br>      log2SbW = 4 − log2SbH<br>    }<br>  }<br>  numSbCoeff = 1 << ( log2SbW + log2SbH )<br>  lastScanPos = numSbCoeff<br>  lastSubBlock = ( 1 << ( log2TbWidth + log2TbHeight − ( log2SbW + log2SbH) ) ) − 1<br>  do {<br>    if( lastScanPos = = 0 ) {<br>      lastScanPos = numSbCoeff<br>      lastSubBlock− −<br>    }<br>    lastScanPos− −<br>    xS = DiagScanOrder[ log2TbWidth − log2SbW ][ log2TbHeight − log2SbH ]<br>      [ lastSubBlock ][ 0 ]<br>    yS = DiagScanOrder[ log2TbWidth − log2SbW ][ log2TbHeight − log2SbH ]<br>      [ lastSubBlock ][ 1 ] |  |

TABLE 8-continued

|  | Descriptor |
|---|---|

```
    xC = ( xS << log2SbW ) + DiagScanOrder[ log2SbW ][ log2SbH ]
lastScanPos ][ 0 ]
    yC = ( yS << log2SbH ) + DiagScanOrder[ log2SbW ][ log2SbH ]
lastScanPos ][ 1 ]
  } while( ( xC != LastSignificantCoeffX ) | | ( yC != LastSignificantCoeffY ) )
  QState = 0
  for( i = lastSubBlock; i >= 0; i- -) {
    startQStateSb = QState
    xS = DiagScanOrder[ log2TbWidth - log2SbW ][ log2TbHeight - log2SbH ]
             [ i ][ 0 ]
    yS = DiagScanOrder[ log2TbWidth - log2SbW ][ log2TbHeight - log2SbH ]
             [ i ][ 1 ]
    inferSbDcSigCoeffFlag = 0
    if( ( i < lastSubBlock ) && ( i > 0 ) ) {
      coded_sub_block_flag[ xS ][ yS ]                                    ae(v)
      inferSbDcSigCoeffFlag = 1
    }
    firstSigScanPosSb = numSbCoeff
    lastSigScanPosSb = -1
    remBinsPass1 = ( ( log2SbW + log2SbH ) < 4 ? 8 : 32)
    firstPosMode0 = ( i == lastSubBlock ? lastScanPos : numSbCoeff - 1)
    firstPosMode1 = -1
    for( n = firstPosMode0; n >= 0 && remBinsPass1 >=4; n- -) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( coded_sub_block_flag[ xS ][ yS ] && ( n > 0 | |
!inferSbDcSigCoeffFlag) &&
          ( xC != LastSignificantCoeffX | | yC != Last SignificantCoeffY ) ) {
        sig_coeff_flag[ xC ][ yC ]                                        ae(v)
        remBinsPass1- -
        if( sig_coeff flag[ xC ][ yC ] )
          inferSbDcSigCoeffFlag = 0
      }
      if( sig_coeff flag[ xC ][ yC ] ) {
        if( !transform_skip_flag[ x0 ][ y0 ] ) {
          numSigCoeff++
          if( ( n >= 8 && i == 0 && ( log2TbWidth <=3 )
      && ( log2TbWidth = = log2TbHeight ) ) | | ( ( i = = 1 | | i = = 2 )
            && log2TbWidth >= 3 && log2TbHeight >= 3 ) )
            numZeroOutSigCoeff++
        }
        abs_level_gtx_flag[ n ][ 0 ]                                      ae(v)
        remBinsPass1- -
        if( abs_level_gtx_flag[ n ][ 0 ] ) {
          par_level_flag[ n ]                                             ae(v)
          remBinsPass1- -
          abs_level_gtx_flag[ n ][ 1 ]                                    ae(v)
          remBinsPass1- -
        }
        if( lastSigScanPosSb = = -1)
          lastSigScanPosSb = n
        firstSigScanPosSb = n
      }
      AbsLevelPass1[ xC ][ yC ] = sig_coeff flag[ xC ][ yC ] + par_level_flag[ n ] +
              abs_level_gtx_flag[ n ][ 0 ] + 2 * abs_level_gtx_flag[ n ][ 1 ]
      if( dep_quant_enabled_flag )
        QState = QStateTransTable[ QState ][ AbsLevelPass1[ xC ][ yC ] & 1 ]
      if( remBinsPass1 < 4 )
        firstPosMode1 = n - 1
    }
    for( n = numSbCoeff - 1; n >= firstPosMode1; n- - ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( abs_level_gtx_flag[ n ][ 1 ] )
        abs_remainder[ n ]                                                ae(v)
      AbsLevel[ xC ][ yC ] = AbsLevelPass1[ xC ][ yC ] +2 * abs_remainder[ n ]
    }
    for( n = firstPosMode1; n >= 0; n- -) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      dec_abs_level[ n ]                                                  ae(v)
      if(AbsLevel[ xC ][ yC ] > 0 )
        firstSigScanPosSb = n
      if( dep_quant_enabled_flag )
        QState = QStateTransTable[ QState ][ AbsLevel[ xC ][ yC ] & 1 ]
    }
```

TABLE 8-continued

|  | Descriptor |
|---|---|
| ```
  if( dep_quant_enabled_flag | | !sign_data_hiding_enabled_flag )
    signHidden = 0
  else
    signHidden = ( lastSigScanPosSb − firstSigScanPosSb >3 ? 1 : 0)
  for( n = numSbCoeff − 1; n >= 0; n− − ) {
    xC = ( xS << log2SbW ) + DiagScanOrder[ log2SbW ][ log2SbH ][ n ][ 0 ]
    yC = ( yS << log2SbH ) + DiagScanOrder[ log2SbW ][ log2SbH ][ n ][ 1 ]
    if( ( AbsLevel[ xC ][ yC ] > 0 ) &&
      ( !signHidden | | ( n != firstSigScanPosSb ) ) )
      coeff_sign_flag[ n ]
  }
  if( dep_quant_enabled_flag ) {
    QState = startQStateSb
    for( n = numSbCoeff − 1; n >= 0; n− − ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( AbsLevel[ xC ][ yC ] > 0 )
        TransCoeffLevel[ x0 ][ y0 ][ cIdx ][ xC ][ yC ] =
          ( 2 * AbsLevel[ xC ][ yC ] − ( QState > 1 ? 1 : 0 ) ) *
          ( 1 − 2 * coeff_sign_flag[ n ] )
      QState = QStateTransTable QState1[ par_level_flag[ n ] ]
  } else {
    sumAbsLevel = 0
    for( n = numSbCoeff − 1; n >= 0; n− − ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( AbsLevel[ xC ][ yC ] > 0 ) {
        TransCoeffLevel[ x0 ][ y0 ][ cIdx ][ xC ][ yC ] =
          AbsLevel[ xC ][ yC ] * ( 1 − 2 * coeff_sign_flag[ n ] )
        if( signHidden ) {
          sumAbsLevel += AbsLevel[ xC ][ yC ]
          if( ( n == firstSigScanPosSb ) && ( sumAbsLevel % 2 ) = = 1 ) )
            TransCoeffLevel[ x0 ][ y0 ][ cIdx ][ xC ][ yC ] =
              −−−TransCoeffLevel[ x0 ][ y0 ][ cIdx ][ xC ][ yC ]
        }
      }
    }
  }
 }
}
``` | <br><br><br><br><br><br><br><br><br>ae(v) |

Table 9 shows another exemplary modified residual coding syntax according to an embodiment of the disclosure.

TABLE 9

|  | Descriptor |
|---|---|
| ```
residual_coding( x0, y0, log2TbWidth, log2TbHeight, cIdx ) {
  if( ( tu_mts_idx[ x0 ][ y0 ] > 0 | |
      ( cu_sbt_flag && log2TbWidth < 6 && log2TbHeight < 6 ) )
      && cIdx = = 0 && log2TbWidth > 4)
    log2ZoTbWidth = 4
  else
    log2ZoTbWidth = Min( log2TbWidth, 5 )
  MaxCcbs = 2 * ( 1 << log2TbWidth ) * ( 1<< log2TbHeight )
  if( tu_mts_idx[ x0 ][ y0 ] > 0 | |
      ( cu_sbt_flag && log2TbWidth < 6 && log2TbHeight < 6 ) )
      && cIdx = = 0 && log2TbHeight > 4)
    log2ZoTbHeight = 4
  else
    log2ZoTbHeight = Min( log2TbHeight, 5 )
  if( log2TbWidth > 0)
    last_sig_coeff_x_prefix
  if( log2TbHeight > 0 )
    last_sig_coeff_y_prefix
  if( last_sig_coeff_x_prefix > 3)
    last_sig_coeff_x_suffix
  if( last_sig_coeff_y_prefix > 3)
    last_sig_coeff_y_suffix
  log2TbWidth = log2ZoTbWidth
  log2TbHeight = log2ZoTbHeight
  remBinsPass1 = ( ( 1 << ( log2TbWidth + log2TbHeight ) ) * 7 ) >> 2
``` | <br><br><br><br><br><br><br><br><br><br><br><br><br>ae(v)<br><br>ae(v)<br><br>ae(v)<br><br>ae(v) |

TABLE 9-continued

| | Descriptor |
|---|---|
| ```
log2SbW = ( Min( log2TbWidth, log2TbHeight ) < 2 ? 1 : 2 )
log2SbH = log2SbW
if( log2TbWidth + log2TbHeight > 3 ) {
   if( log2TbWidth < 2 ) {
      log2SbW = log2TbWidth
      log2SbH = 4 − log2SbW
   } else if( log2TbHeight < 2 ) {
      log2SbH = log2TbHeight
      log2SbH = 4 − log2SbH
   }
}
numSbCoeff = 1 << ( log2SbW + log2SbH )
lastScanPos = numSbCoeff
lastSubBlock = ( 1 << ( log2TbWidth + log2TbHeight − ( log2SbW +
log2SbH ) ) ) − 1
do {
   if( lastScanPos = = 0) {
      lastScanPos = numSbCoeff
      lastSubBlock− −
   }
   lastScanPos− −
   xS = DiagScanOrder[ log2TbWidth − log2SbW ][ log2TbHeight − log2SbH
           ][ lastSubBlock ][ 0 ]
   yS = DiagScanOrder[ log2TbWidth − log2SbW ][ log2TbHeight − log2SbH
           ][ lastSubBlock ][ 1 ]
   xC = ( xS << log2SbW ) + DiagScanOrder[ log2SbW ][ log2SbH ]
[ lastScanPos ][ 0 ]
   yC = ( yS << log2SbH ) + DiagScanOrder[ log2SbW ][ log2SbH ]
[ lastScanPos ][ 1 ]
} while( ( xC != LastSignificantCoeffX ) | | ( yC != LastSignificantCoeffY ) )
if( lastSubBlock = = 0 && log2TbWidth >= 2 && log2TbHeight >= 2 &&
    !transform_skip_flag[ x0 ][ y0 ] && lastScanPos > 0)
   LfnstDcOnly = 0
if( Min( lfnstWidth, lfnstHeight ) >= 4 && sps_lfnst_enabled_flag = = 1 &&
    CuPredMode[ x0 ][ y0 ]] = = MODE_INTRA &&
    IntraSubPartitionsSplitType = = ISP_NO_SPLIT &&
    ( !intra_mip_flag[ x0 ][ y0 ] | | Min( lfnstWidth, lfnstHeight ) >= 16) &&
    tu_mts_idx[ x0 ][ y0 ] = = 0 && Max( cbWidth, cbHeight ) <= MaxTbSizeY &&
    LfnstDcOnly = = 0) {
   lfnst_idx[ x0 ][ y0 ]
}
``` | ae(v) |
| ```
QState = 0
for( i = lastSubBlock; i >= 0; i− −) {
   startQStateSb = QState
   xS = DiagScanOrder[ log2TbWidth − log2SbW ][ log2TbHeight − log2SbH ]
           [ i ][ 0 ]
   yS = DiagScanOrder[ log2TbWidth − log2SbW ][ log2TbHeight − log2SbH ]
           [ i ][ 1 ]
   inferSbDcSigCoeffFlag = 0
   if( ( i < lastSubBlock ) && ( i > 0 ) && !lfnst_idx[ x0 ][ y0 ] ) {
      coded_sub_block_flag[ xS ][ yS ]
``` | ae(v) |
| ```
      inferSbDcSigCoeffFlag = 1
   }
   firstSigScanPosSb = numSbCoeff
   lastSigScanPosSb = −1
   firstPosMode0 = ( i = = lastSubBlock ? lastScanPos : numSbCoeff − 1 )
   firstPosMode1 = −1
   for( n = firstPosMode0; n >= 0 && remBinsPass1 >= 4; n− −) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( coded_sub_block_flag[ xS ][ yS + && ( n > 0 | | !inferSbDcSigCoeffFlag )
&&
         ( xC != LastSignificantCoeffX | | yC != Last SignificantCoeffY ) ) {
         sig_coeff_flag[ xC ][ yC ]
``` | ae(v) |
| ```
         remBinsPass1− −
         if( sig_coeff_flag[ xC ][ yC ] )
            inferSbDcSigCoeffFlag = 0
      }
      if( sig_coeff_flag[ xC ][ yC ] ) {
         abs_level_gtx_flag[ n ][ 0 ]
``` | ae(v) |
| ```
         remBinsPass1− −
         if( abs_level_gtx_flag[ n ][ 0 ] ) {
            par_level_flag[ n ]
``` | ae(v) |
| ```
            remBinsPass1− −
            abs_level_gtx_flag[ n ][ 1 ]
``` | ae(v) |
| ```
            remBinsPass1− −
         }
         if( lastSigScanPosSb = = −1)
``` | |

TABLE 9-continued

| | Descriptor |
|---|---|
|         lastSigScanPosSb = n<br>        firstSigScanPosSb = n<br>      }<br>      AbsLevelPass1[ xC ][ yC ] = sig_coeff_flag[ xC ][ yC ] + par_level_flag[ n ] +<br>                        abs_level_gtx_flag[ n ][ 0 ] + 2 * abs_level_gtx_flag[ n ][ 1 ]<br>      if( dep_quant_enabled_flag )<br>        QState = QStateTransTable + QState if AbsLevelPass1[ xC ][ yC ] & 1 ]<br>      if( remBinsPass1 < 4 )<br>        firstPosModel = n − 1<br>    }<br>    for( n = numSbCoeff − 1; n >= firstPosMode 1; n− −) {<br>      xC = ( xS << log2SbW ) + DiagScanOrder[ log2SbW ][ log2SbH ][ n ][ 0 ]<br>      yC = ( yS << log2SbH ) + DiagScanOrder[ log2SbW ][ log2SbH ][ n ][ 1 ]<br>      if( abs_level_gtx_flag[ n ][ 1 ] ) | |
|         abs_remainder[ n ] | ae(v) |
|       AbsLevel[ xC ][ yC ] = AbsLevelPass1[ xC ][ yC ] +2 * abs_remainder[ n ]<br>    }<br>    for( n = firstPosModel; n >= 0; n− −) {<br>      xC = ( xS << log2SbW ) + DiagScanOrder[ log2SbW ][ log2SbH ][ n ][ 0 ]<br>      yC = ( yS << log2SbH ) + DiagScanOrder[ log2SbW ][ log2SbH ][ n ][ 1 ] | |
|       dec_abs_level[ n ] | ae(v) |
|       if(AbsLevel[ xC ][ yC ] > 0 )<br>        firstSigScanPosSb = n<br>      if( dep_quant_enabled_flag )<br>        QState = QStateTransTable[ QState ][ AbsLevel[ xC ][ yC ] & 1 ]<br>    }<br>    if( dep_quant_enabled_flag | | !sign_data_hiding_enabled_flag )<br>      signHidden = 0<br>    else<br>      signHidden = ( lastSigScanPosSb − firstSigScanPosSb > 3 ? 1 : 0 )<br>    for( n = numSbCoeff − 1; n >= 0; n− −) {<br>      xC = ( xS << log2SbW ) + DiagScanOrder[ log2SbW ][ log2SbH ][ n ][ 0 ]<br>      yC = ( yS << log2SbH ) + DiagScanOrder[ log2SbW ][ log2SbH ][ n ][ 1 ]<br>      if( ( AbsLevel[ xC ][ yC ] > 0 ) &&<br>        ( !signHidden | | ( n != firstSigScanPosSb ) ) ) | |
|         coeff_sign_flag[ n ] | ae(v) |
|     }<br>    if( dep_quant_enabled_flag ) {<br>      QState = startQStateSb<br>      for( n = numSbCoeff − 1; n >= 0; n− − ) {<br>        xC = ( xS << log2SbW ) + DiagScanOrder[ log2SbW ][ log2SbH ][ n ][ 0 ]<br>        yC = ( yS << log2SbH ) + DiagScanOrder[ log2SbW ][ log2SbH ][ n ][ 1 ]<br>        if( AbsLevel[ xC ][ yC ] > 0 )<br>          TransCoeffLevel[ x0 ][ y0 ][ cIdx ][ xC ][ yC ] =<br>            ( 2 * AbsLevel[ xC ][ yC ] − ( QState > 1 ? 1 : 0 ) ) *<br>            ( 1 − 2 * coeff_sign_flag[ n ])<br>        QState = QStateTransTable[ QState ][ par_level_flag[ n ]<br>    } else {<br>      sumAbsLevel = 0<br>      for( n = numSbCoeff − 1; n >= 0; n− − ) {<br>        xC = ( xS << log2SbW ) + DiagScanOrder[ log2SbW ][ log2SbH ][ n ][ 0 ]<br>        yC = ( yS << log2SbH ) + DiagScanOrder[ log2SbW ][ log2SbH ][ n ] [ 1 ]<br>        if( AbsLevel] xC ][ yC ] > 0 ) {<br>          TransCoeffLevel[ x0 ][ y0 ][ cIdx ][ xC ][ yC ] =<br>            AbsLevel[ xC ][ yC ] * ( 1 − 2 * coeff_sign_flag[ n ] )<br>          if( signHidden ) {<br>            sumAbsLevel += AbsLevel[ xC ][ yC ]<br>            if( ( n = = firstSigScanPosSb ) && ( sumAbsLevel % 2) = = 1 ) )<br>              TransCoeffLevel[ x0 ][ y0 ][ cIdx ][ xC ][ yC ] =<br>                −TransCoeffLevel[ x0 ][ y0 ][ cIdx ][ xC ][ yC ]<br>          }<br>        }<br>      }<br>    }<br>  }<br>} | |

The CG flag coded_sub_block_flag[xS][yS] specifies the following for the subblock at location (xS, yS) within the current transform block, where a subblock is a (4×4) array of 16 transform coefficient levels:

If coded_sub_block_flag[xS][yS] is equal to 0, the 16 transform coefficient levels of the subblock at location (xS, yS) are inferred to be equal to 0.

Otherwise (coded_sub_block_flag[xS][yS] is equal to 1), the following applies:

If (xS, yS) is equal to (0, 0) and (LastSignificantCoeffX, LastSignificantCoeffY) is not equal to (0, 0), at least one of the 16 sig_coeff_flag syntax elements is present for the subblock at location (xS, yS).

Otherwise, at least one of the 16 transform coefficient levels of the subblock at location (xS, yS) has a non-zero value.

When coded_sub_block_flag[xS][yS] is not present, it is inferred as follows:

If lfnst_idx[xS][yS] is equal to 0 or (xS, yS) is equal to (0, 0) or (xS, yS) is equal to (LastSignificantCoeffX, LastSignificantCoeffY), coded_sub_block_flag[xS][yS] is inferred as 1.

Otherwise, coded_sub_block_flag[xS][yS] is inferred as 0.

XI. Modified General Transform Process

The following process shows an exemplary modified transform process on a current luma TB according to an embodiment of the disclosure.

Inputs to this process include: (1) a luma location (xTbY, yTbY) specifying the top-left sample of the current luma TB relative to the top left luma sample of the current picture; (2) a variable nTbW specifying the width of the current TB; (3) a variable nTbH specifying the height of the current TB; (3) a variable cIdx specifying the colour component of the CB; and (4) an (nTbW)×(nTbH) array d[x][y] of scaled transform coefficients with x=0 . . . nTbW−1, y=0 . . . nTbH−1.

An output of this process is the (nTbW)×(nTbH) array r[x][y] of residual samples with x=0 . . . nTbW−1, y=0 . . . nTbH−1.

When lfnst_idx[xTbY][yTbY] is not equal to 0 and both nTbW and nTbH are greater than or equal to 4, the variables nLfnstSize, log 2LfnstSize, numLfnstX, numLfnstY, and nonZeroSize are derived as follows: (1) log 2LfnstSize is set equal to 3 and nLfnstOutSize is set equal to 48; (2) nLfnstSize is set to (1<<log 2LfnstSize); (3) numLfnstX set equal to 1; (4) numLfnstY set equal to 1; (5) if both nTbW and nTbH are less than or equal to 8, nonZeroSize is set equal to 8; (6) otherwise, nonZeroSize set equal to 16.

For xSbIdx=0 . . . numLfnstX−1 and ySbIdx=0 . . . numLfnstY−1, the variable array u[x] with x=0 . . . nonZeroSize−1 are derived as follows:

$$xC = (xSbIdx << \log 2LfnstSize) + DiagScanOrder[\log 2LfnstSize][\log 2LfnstSize][x][0] \quad (Eq.3)$$

$$yC = (ySbIdx << \log 2LfnstSize) + DiagScanOrder[\log 2LfnstSize][\log 2LfnstSize][x][1] \quad (Eq.4)$$

$$u[x] = d[xC][yC] \quad (Eq.5)$$

u[x] with x=0 . . . nonZeroSize−1 is transformed to the variable array v[x] with x=0 . . . nLfnstOutSize−1 by invoking the one-dimensional transformation process with the transform input length of the scaled transform coefficients nonZeroSize, the transform output length nLfnstOutSize, the list u[x] with x=0 . . . nonZeroSize−1, the index for transform set selection lfnstPredModeIntra, and the index for transform selection in a transform set lfnst_idx[xTbY][yTbY] as inputs, and the output is the list v[x] with x=0 . . . nLfnstOutSize−1. The variable lfnstPredModeIntra is set equal to IntraPredModeY[xTbY][yTbY].

The array d[(xSbIdx<<log 2LfnstSize)+x][(ySbIdx<<log 2LfnstSize)+y] with x=0 . . . min(nTbW, nLfnstSize)−1, y=0 . . . min(nTbH, nLfnstSize)−1 are derived as follows:

If lfnstPredModeIntra is less than or equal to 34, or equal to INTRA_LT_CCLM, INTRA_T_CCLM, or INTRA_L_CCLM, the following applies:

$$d[(xSbIdx<<\log 2LfnstSize)+x][(ySbIdx<<\log 2LfnstSize)+y] = (y<4)?v[x+(y<<\log 2LfnstSize)]:((x<4)?v[32+x+((y-4)<<2)]:d[x][y]) \quad (Eq.7)$$

Otherwise, the following applies:

$$d[(xSbIdx<<\log 2LfnstSize)+x][(ySbIdx<<\log 2LfnstSize)+y] = (x<4)?v[y+(x<<\log 2LfnstSize)]:((y<4)?v[32+y+((x-4)<<2)]:d[x][y]) \quad (Eq.8)$$

XII. Modified LFNST Process

The following process shows an exemplary modified LFNST process according to an embodiment of the disclosure.

Inputs to this process include: (1) a variable nonZeroSize specifying the transform input length; (2) a variable nTrS specifying the transform output length; (3) a list of transform input x[j] with j=0 . . . nonZeroSize−1; (4) a variable lfnstPredModeIntra specifying the index for transform set selection; and (5) a variable lfnstIdx specifying the index for transform selection in a transform set.

An output of this process is the list of transformed samples y[i] with i=0 . . . nTrS−1.

The transformation matrix derivation process is involved with the transform output length nTrS, the index for transform set selection lfnstPredModeIntra, and the index for transform selection in a transform set lfnstIdx as inputs, and the transformation matrix lowFreqTransMatrix as output.

The list of transformed samples y[i] with i=0 . . . nTrS−1 is derived as follows:

$$y[i] = \text{Clip3}(\text{CoeffMin}, \text{CoeffMax}, ((\Sigma_{j=0}^{nonZeroSize-1} \text{lowFreqTransMatrix}[i][j]*x[j]) + 64) >> 7) \quad (Eq.9)$$

The following process shows another exemplary modified LFNST process according to an embodiment of the disclosure.

Inputs to this process include: (1) a variable nonZeroSize specifying the transform input length; (2) a variable nTrS specifying the transform output length; (3) a list of scaled non-zero transform coefficients x[j] with j=0 . . . nonZeroSize−1; (4) a variable predModeIntra specifying the intra prediction mode for LFNST set selection; and (5) a variable lfnstIdx specifying the LFNST index for transform selection in the selected LFNST set.

An output of this process is the list of transformed samples y[i] with i=0 . . . nTrS−1.

The variable lfnstIdx is set equal to (predModeIntra % 2)==0 ? lfnstIdx: (3−lfnstIdx).

The transformation matrix derivation process as specified is invoked with the transform output length nTrS, the intra prediction mode for LFNST set selection predModeIntra, and the LFNST index for transform selection in the selected LFNST set lfnstIdx as inputs, and the (nTrS)×(nonZeroSize) LFNST matrix lowFreqTransMatrix as output.

The list of transformed samples y[i] with i=0 . . . nTrS−1 is derived as follows:

$$y[i] = \text{Clip3}(\text{CoeffMin}, \text{CoeffMax}, ((\Sigma_{j=0}^{nonZeroSize-1} \text{lowFreqTransMatrix}[i][j]*x[j]) + 64) >> 7) \quad (Eq.10)$$

XIII. Modified LFNST Matrix Derivation Process

The following process shows an exemplary modified LFNST matrix derivation process.

Inputs to this process include a variable lfnstPredModeIntra specifying the index for transform set selection and a variable lfnstIdx specifying the index for transform selection in the selected transform set.

An output of this process is the transformation matrix lowFreqTransMatrix.

The variable lfnstTrSetIdx is specified in Table 10 depending on lfnstPredModeIntra.

TABLE 10

| lfnstPredModeIntra | lfnstTrSetIdx |
|---|---|
| lfnstPredModeIntra < 0 | 1 |
| 0 <= lfnstPredModeIntra <= 1 | 0 |
| 2 <= lfnstPredModeIntra <= 12 | 1 |
| 13 <= lfnstPredModeIntra <= 23 | 2 |
| 24 <= lfnstPredModeIntra <= 44 | 3 |
| 45 <= lfnstPredModeIntra <= 55 | 2 |
| 56 <= lfnstPredModeIntra <= 80 | 1 |
| 81 <= lfnstPredModeIntra <= 83 | 0 |

The transformation matrix lowFreqTransMatrix is derived based on lfnstTrSetIdx and lfnstIdx, in regardless of the transform output length nTrS.

XIV. Flowchart

Figure 16:
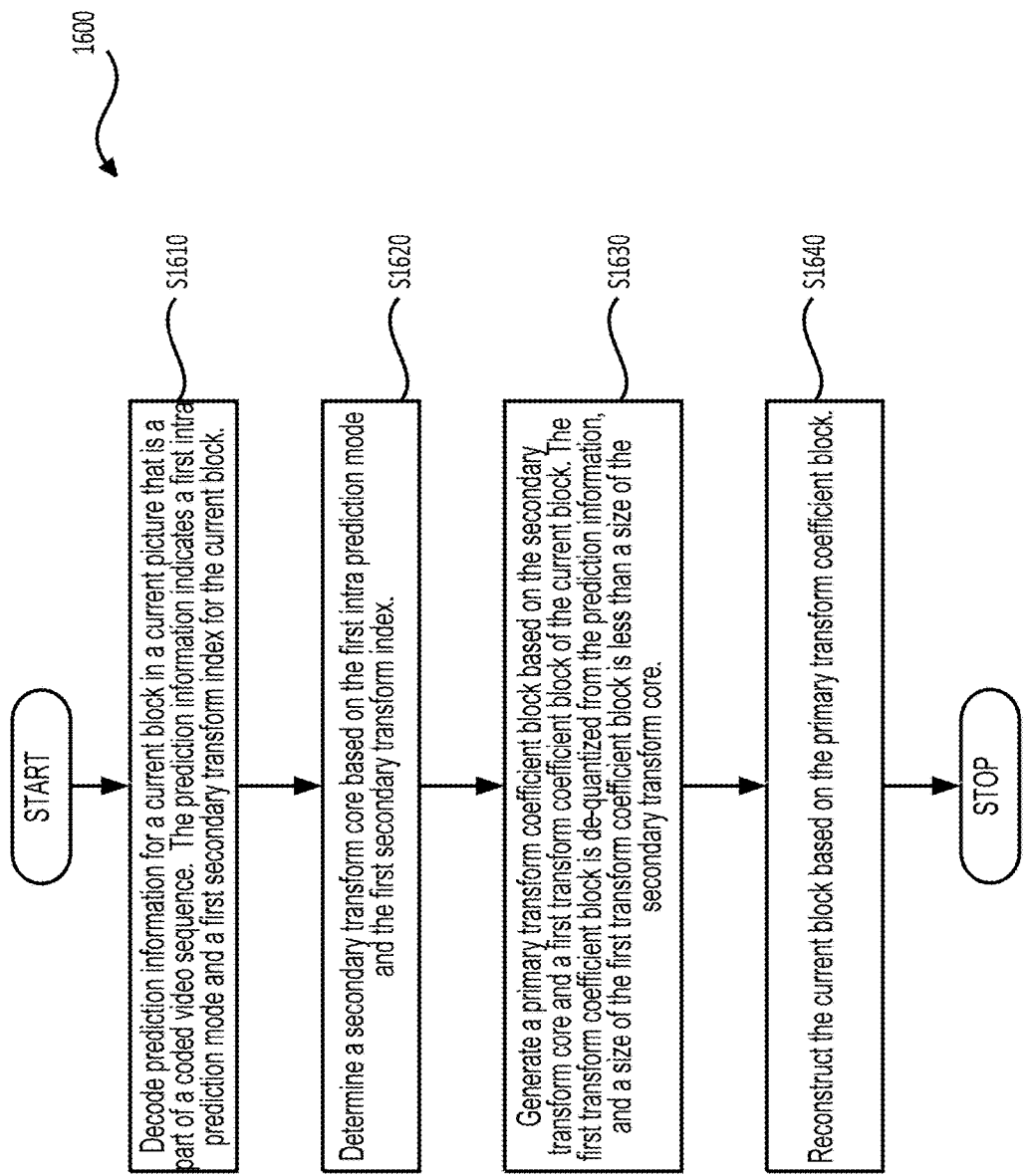
FIG. 16 shows a flow chart outlining an exemplary process in accordance with an embodiment.

FIG. 16 shows a flow chart outlining an exemplary process (1600) according to an embodiment of the disclosure. In various embodiments, the process (1600) is executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1600) is implemented in software instructions, thus when the processing circuitry executes the software instructions, the processing circuitry performs the process (1600).

The process (1600) may generally start at step (S1610), where the process (1600) decodes prediction information for a current block in a current picture that is a part of a coded video sequence. The prediction information indicates a first intra prediction mode and a secondary transform index for the current block. Then the process (1600) proceeds to step (S1620).

At step (S1620), the process (1600) determines a secondary transform core based on the first intra prediction mode and the secondary transform index. Then the process (1600) proceeds to step (S1630).

At step (S1630), the process (1600) generates a primary transform coefficient block based on the secondary transform core and a first transform coefficient block of the current block. The first transform coefficient block is dequantized from the prediction information, and a size of the first transform coefficient block is less than a size of the secondary transform core. Then the process (1600) proceeds to step (S1640).

At step (S1640), the process (1600) reconstructs the current block based on the primary transform coefficient block.

After reconstructing the current block, the process (1600) terminates.

In an embodiment, the process (1600) generates a second transform coefficient block with a value at each coordinate position being 0. Then the process (1600) determines a value at a coordinate position of the second transform coefficient block based on a value at a same coordinate position of the first transform coefficient block. The process (1600) generates the primary transform coefficient block based on the secondary transform core and the second transform coefficient block.

In an embodiment, the process (1600) applies a part of the secondary transform core to the first transform coefficient block.

In an embodiment, the process (1600) determines whether to transpose the primary transform coefficient block based on a type of one-dimensional cross-component linear model. Then the process (1600) transposes the primary transform coefficient block based on a determination that the primary transform coefficient block is to be transposed.

According to aspects of the disclosure, syntax elements of the first transform coefficient block include a syntax element that indicates the secondary transform index.

In an embodiment, the secondary transform index is signaled after a last non-zero transform coefficient of the first transform coefficient block and before one or more of the syntax elements related to coefficient coding of the first transform coefficient block.

In an embodiment, whether one of the syntax elements is signaled is dependent on the secondary transform index and a transform coefficient associated with the one of the syntax elements.

In an embodiment, a syntax element indicating one or more primary transform cores for the current block is signaled after a last non-zero transform coefficient of the first transform coefficient block and before one or more syntax elements related to coefficient coding of the first transform coefficient block.

In an embodiment, the process (1600) determines a context used for entropy coding of the secondary transform index based on a shape of the secondary transform core.

In an embodiment, the process (1600) determines the secondary transform core based on the secondary transform index, a mode number of the first intra prediction mode, and a second intra prediction mode adjacent to the first intra prediction mode.

In an embodiment, the process (1600) determines a context used for entropy coding of the secondary transform index based on a mode number of the first intra prediction mode.

XV. Computer System

The presented methods may be used separately or combined in any order. Further, each of the embodiments, encoder, and decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 17 shows a computer system (1700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 17:
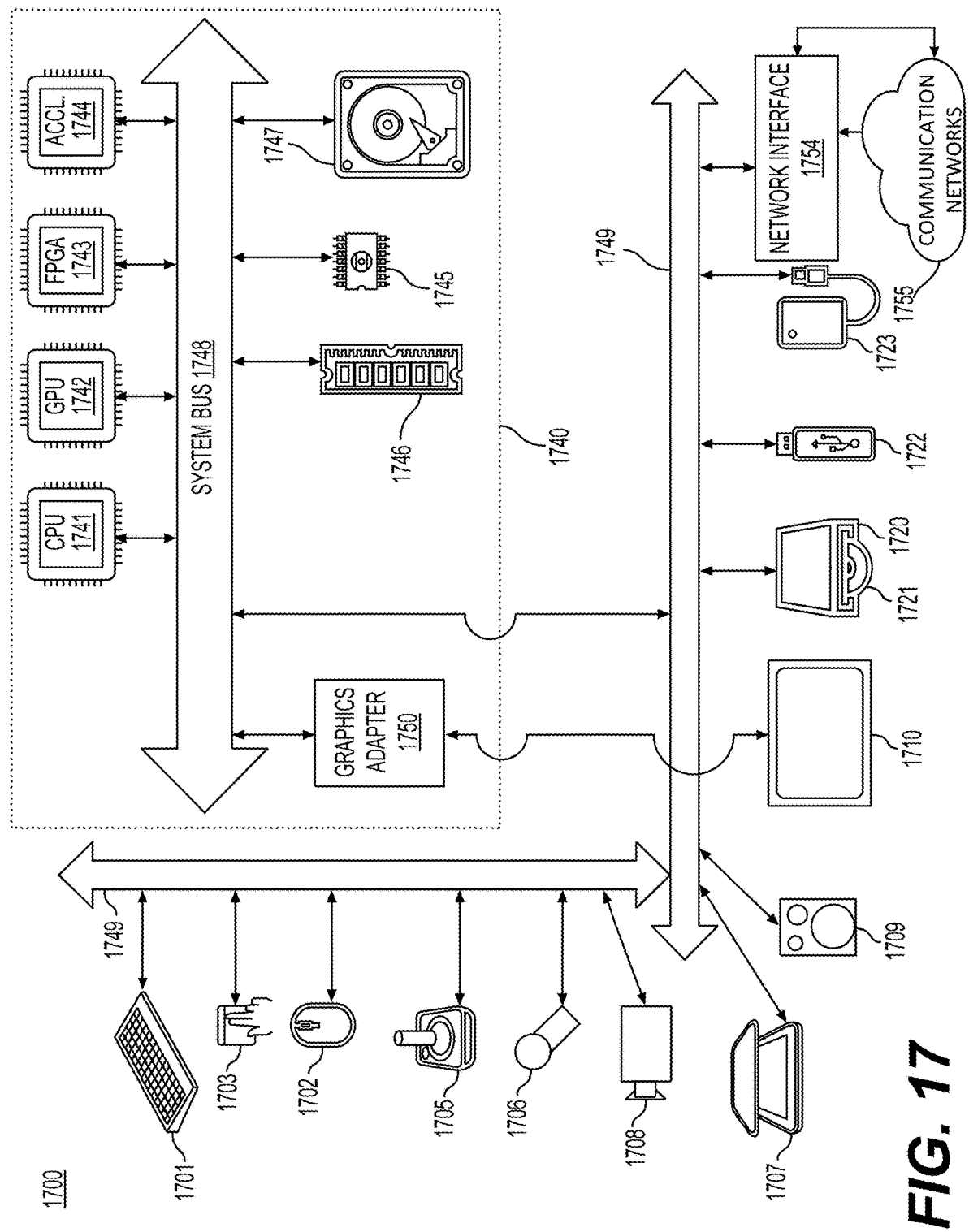
FIG. 17 shows a schematic illustration of a computer system in accordance with an embodiment.

The components shown in FIG. 17 for computer system (1700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1700).

Computer system (1700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1701), mouse (1702), trackpad (1703), touch screen (1710), data-glove (not shown), joystick (1705), microphone (1706), scanner (1707), camera (1708).

Computer system (1700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1710), data-glove (not shown), or joystick (1705), but there can also be tactile feedback devices that do not serve as input devices), audio output devices (such as: speakers (1709), headphones (not depicted)), visual output devices (such as screens (1710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (1710)) can be connected to a system bus (1748) through a graphics adapter (1750).

Computer system (1700) can also include human accessible storage devices and their associated media such as optical media including CD/DVD ROM/RW (1720) with CD/DVD or the like media (1721), thumb-drive (1722), removable hard drive or solid state drive (1723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1700) can also include a network interface (1754) to one or more communication networks (1755). The one or more communication networks (1755) can for example be wireless, wireline, optical. The one or more communication networks (1755) can further be local, wide-area, metropolitan, vehicular and industrial, real-time, delay-tolerant, and so on. Examples of the one or more communication networks (1755) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1749) (such as, for example USB ports of the computer system (1700)); others are commonly integrated into the core of the computer system (1700) by attachment to a system bus as described below (for example Ethernet interface into a PC computer system or cellular network interface into a smartphone computer system). Using any of these networks, computer system (1700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1740) of the computer system (1700).

The core (1740) can include one or more Central Processing Units (CPU) (1741), Graphics Processing Units (GPU) (1742), specialized programmable processing units in the form of Field Programmable Gate Areas (FPGA) (1743), hardware accelerators for certain tasks (1744), and so forth. These devices, along with Read-only memory (ROM) (1745), Random-access memory (1746), internal mass storage such as internal non-user accessible hard drives, SSDs, and the like (1747), may be connected through the system bus (1748). In some computer systems, the system bus (1748) can be accessible in the form of one or more physical plugs to enable extensions by additional CPUs, GPU, and the like. The peripheral devices can be attached either directly to the core's system bus (1748), or through a peripheral bus (1749). Architectures for a peripheral bus include PCI, USB, and the like.

CPUs (1741), GPUs (1742), FPGAs (1743), and accelerators (1744) can execute certain instructions that, in combination, can make up the aforementioned computer code. That computer code can be stored in ROM (1745) or RAM (1746). Transitional data can be also be stored in RAM (1746), whereas permanent data can be stored for example, in the internal mass storage (1747). Fast storage and retrieve to any of the memory devices can be enabled through the use of cache memory, that can be closely associated with one or more CPU (1741), GPU (1742), mass storage (1747), ROM (1745), RAM (1746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1700), and specifically the core (1740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1740) that are of non-transitory nature, such as core-internal mass storage (1747) or ROM (1745). The software implementing various embodiments of the present disclosure can be stored in such devices and executed by core (1740). A computer-readable medium can include one or more memory devices or chips, according to particular needs. The software can cause the core (1740) and specifically the processors therein (including CPU, GPU, FPGA, and the like) to execute particular processes or particular parts of particular processes described herein, including defining data structures stored in RAM (1746) and modifying such data structures according to the processes defined by the software. In addition or as an alternative, the computer system can provide functionality as a result of logic hard-wired or otherwise embodied in a circuit (for example: accelerator (1744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

AMT: Adaptive Multiple Transform
AMVP: Advanced Motion Vector Prediction
ASIC: Application-Specific Integrated Circuit
ATMVP: Alternative/Advanced Temporal Motion Vector Prediction
BDOF: Bi-directional Optical Flow
BDPCM (or RDPCM): Residual Difference Pulse Coded Modulation
BIO: Bi-directional Optical Flow
BMS: Benchmark Set
BT: Binary Tree
BV: Block Vector
CANBus: Controller Area Network Bus
CB: Coding Block
CBF: Coded Block Flag
CCLM: Cross-Component Linear Mode/Model
CD: Compact Disc
CPR: Current Picture Referencing
CPU: Central Processing Unit
CRT: Cathode Ray Tube
CTB: Coding Tree Block
CTU: Coding Tree Unit
CU: Coding Unit
DM: Derived Mode
DPB: Decoder Picture Buffer
DVD: Digital Video Disc
EMT: Enhanced Multiple Transform
FPGA: Field Programmable Gate Areas
GOP: Group of Picture
GPU: Graphics Processing Unit
GSM: Global System for Mobile communications
HDR: High Dynamic Range
HEVC: High Efficiency Video Coding
HRD: Hypothetical Reference Decoder
IBC: Intra Block Copy
IC: Integrated Circuit
IDT: Identify Transform
ISP: Intra Sub-Partitions
JEM: Joint Exploration Model
JVET: Joint Video Exploration Team
LAN: Local Area Network
LCD: Liquid-Crystal Display
LFNST: Low Frequency Non-Separable Transform, or Low Frequency Non-Separable Secondary Transform
LTE: Long-Term Evolution
L_CCLM: Left-Cross-Component Linear Mode/Model
LT_CCLM: Left and Top Cross-Component Linear Mode/Model
MIP: Matrix based Intra Prediction
MPM: Most Probable Mode
MRLP (or MRL): Multiple Reference Line Prediction
MTS: Multiple Transform Selection
MV: Motion Vector
NSST: Non-Separable Secondary Transform
OLED: Organic Light-Emitting Diode
PBs: Prediction Blocks
PCI: Peripheral Component Interconnect
PDPC: Position Dependent Prediction Combination
PLD: Programmable Logic Device
PPR: Parallel-Processable Region
PPS: Picture Parameter Set
PU: Prediction Unit
QT: Quad-Tree
RAM: Random Access Memory
ROM: Read-Only Memory
RST: Reduced-Size Transform
SBT: Sub-block Transform
SCC: Screen Content Coding
SCIPU: Small Chroma Intra Prediction Unit
SDR: Standard Dynamic Range
SEI: Supplementary Enhancement Information
SNR: Signal Noise Ratio
SPS: Sequence Parameter Set
SSD: Solid-state Drive
SVT: Spatially Varying Transform
TSM: Transform Skip Mode
TT: Ternary Tree
TU: Transform Unit
T_CCLM: Top Cross-Component Linear Mode/Model
USB: Universal Serial Bus
VPDU: Visual Process Data Unit
VPS: Video Parameter Set
VUI: Video Usability Information
VVC: Versatile Video Coding
WAIP: Wide-Angle Intra Prediction

What is claimed is:

1. A method for video decoding in a decoder, comprising:
decoding prediction information for a current block in a current picture that is a part of a coded video sequence, the prediction information indicating a first intra prediction mode and a secondary transform index for the current block;
determining a secondary transform core based on the first intra prediction mode and the secondary transform index;
generating a primary transform coefficient block based on the secondary transform core and a first transform coefficient block of the current block, the first transform coefficient block being de-quantized from the prediction information, and a size of the first transform coefficient block being less than a size of the secondary transform core;
determining whether to transpose the primary transform coefficient block based on a type of one-dimensional cross-component linear model;
transposing the primary transform coefficient block based on a determination that the primary transform coefficient block is to be transposed; and
reconstructing the current block based on the transposed primary transform coefficient block.

2. The method of claim 1, further comprising:
generating a second transform coefficient block with a value at each coordinate position being 0; and
determining a value at a coordinate position of the second transform coefficient block based on a value at a same coordinate position of the first transform coefficient block, wherein the generating the primary transform coefficient block includes generating the primary transform coefficient block based on the secondary transform core and the second transform coefficient block.

3. The method of claim 1, wherein the generating the primary transform coefficient block includes applying a part of the secondary transform core to the first transform coefficient block.

4. The method of claim 1, wherein syntax elements of the first transform coefficient block include a syntax element that indicates the secondary transform index.

5. The method of claim 4, wherein the secondary transform index is signaled after a last non-zero transform coefficient of the first transform coefficient block and before one or more of the syntax elements related to coefficient coding of the first transform coefficient block.

6. The method of claim 4, wherein whether one of the syntax elements is signaled is dependent on the secondary transform index and a transform coefficient associated with the one of the syntax elements.

7. The method of claim 1, wherein a syntax element indicating one or more primary transform cores for the current block is signaled after a last non-zero transform coefficient of the first transform coefficient block and before one or more syntax elements related to coefficient coding of the first transform coefficient block.

8. The method of claim 1, further comprising:
determining a context used for entropy coding of the secondary transform index based on a shape of the secondary transform core.

9. The method of claim 1, wherein the determining the secondary transform core comprises:
determining the secondary transform core based on the secondary transform index, a mode number of the first intra prediction mode, and a second ultra prediction mode adjacent to the first intra prediction mode.

10. The method of claim 1, further comprising:
determining a context used for entropy coding of the secondary transform index based on a mode number of the first intra prediction mode.

11. An apparatus, comprising processing circuitry configured to:
decode prediction information for a current block in a current picture that is a part of a coded video sequence, the prediction information indicating a first intra prediction mode and a secondary transform index for the current block;
determine a secondary transform core based on the first intra prediction mode and the secondary transform index;
generate a primary transform coefficient block based on the secondary transform core and a first transform coefficient block of the current block, the first transform coefficient block being de-quantized from the prediction information, and a size of the first transform coefficient block being less than a size of the secondary transform core;
determine whether to transpose the primary transform coefficient block based on a type of one-dimensional cross-component linear model;
transpose the primary transform coefficient block based on a determination that the primary transform coefficient block is to be transposed; and
reconstruct the current block based on the transposed primary transform coefficient block.

12. The apparatus of claim 11, wherein the processing circuitry is further configured to:
generate a second transform coefficient block with a value at each coordinate position being 0; and
determine a value at a coordinate position of the second transform coefficient block based on a value at a same coordinate position of the first transform coefficient block, wherein the primary transform coefficient block is generated based on the secondary transform core and the second transform coefficient block.

13. The apparatus of claim 11, wherein the processing circuitry is further configured to:
apply a part of the secondary transform core to the first transform coefficient block.

14. The apparatus of claim 11, wherein syntax elements of the first transform coefficient block include a syntax element that indicates the secondary transform index.

15. The apparatus of claim 11, wherein a syntax element indicating one or more primary transform cores for the current block is signaled after a last non-zero transform coefficient of the first transform coefficient block and before one or more syntax elements related to coefficient coding of the first transform coefficient block.

16. The apparatus of claim 11, wherein the processing circuitry is further configured to:
determine a context used for entropy coding of the secondary transform index based on a shape of the secondary transform core.

17. The apparatus of claim 11, wherein the processing circuitry is further configured to:
determine the secondary transform core based on the secondary transform index a mode number of the first intra prediction mode, and a second intra prediction mode adjacent to the first intra prediction mode.

18. A non-transitory computer-readable storage medium storing a program executable by at least one processor to perform:

decoding prediction information for a current block in a current picture that is a part of a coded video sequence, the prediction information indicating a first intra prediction mode and a secondary transform index for the current block;

determining a secondary transform core based on the first intra prediction mode and the secondary transform index;

generating a primary transform coefficient block based on the secondary transform core and a first transform coefficient block of the current block, the first transform coefficient block being de-quantized from the prediction information, and a size of the first transform coefficient block being less than a size of the secondary transform core;

determining whether to transpose the primary transform coefficient block based on a type of one-dimensional cross-component linear model;

transposing the primary transform coefficient block based on a determination that the primary transform coefficient block is to be transposed; and reconstructing the current block based on the transposed primary transform coefficient block.

* * * * *